(12) United States Patent
Okayama

(10) Patent No.: US 7,839,565 B2
(45) Date of Patent: Nov. 23, 2010

(54) OPTICAL DEFLECTOR

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 103 days.

(21) Appl. No.: 12/213,431

(22) Filed: Jun. 19, 2008

(65) Prior Publication Data

US 2009/0015904 A1    Jan. 15, 2009

(30) Foreign Application Priority Data

Jul. 13, 2007    (JP) .............................. 2007-184628

(51) Int. Cl.
    *G02F 1/29* (2006.01)
(52) U.S. Cl. .................................................. 359/315
(58) Field of Classification Search ................ 359/315, 359/321, 322, 237, 240, 245, 246, 258, 298; 385/2, 4, 8, 10
    See application file for complete search history.

(56) References Cited

U.S. PATENT DOCUMENTS 3,804,488 A * 4/1974 Eden ........................... 359/316
6,449,084 B1    9/2002 Guo
6,947,625 B2    9/2005 Nishizawa et al.

OTHER PUBLICATIONS

Nakamura et al., "Wide-angle, low-voltage electro-optic beam deflection based on space-charge-controlled mode of electrical conduction in $KTa_{1-x}Nb_xO_3$," Applied Physics Letters 89, 13115 (2006).

* cited by examiner

*Primary Examiner*—Ricky L Mack
*Assistant Examiner*—Tuyen Q Tra
(74) *Attorney, Agent, or Firm*—Rabin & Berdo, PC

(57) ABSTRACT

An optical deflector made of an electro-optic material has one or more pairs of electrodes on opposite surfaces. Each pair of electrodes defines an interaction region in which an electric field applied from the electrodes produces a linear refractive-index gradient in the direction of the electric field. An incident light beam is refracted in this direction within the interaction region. The interaction region is shaped so that the light beam is also refracted in an orthogonal direction when it enters or leaves the interaction region. The light beam is thereby deflected three-dimensionally.

7 Claims, 24 Drawing Sheets

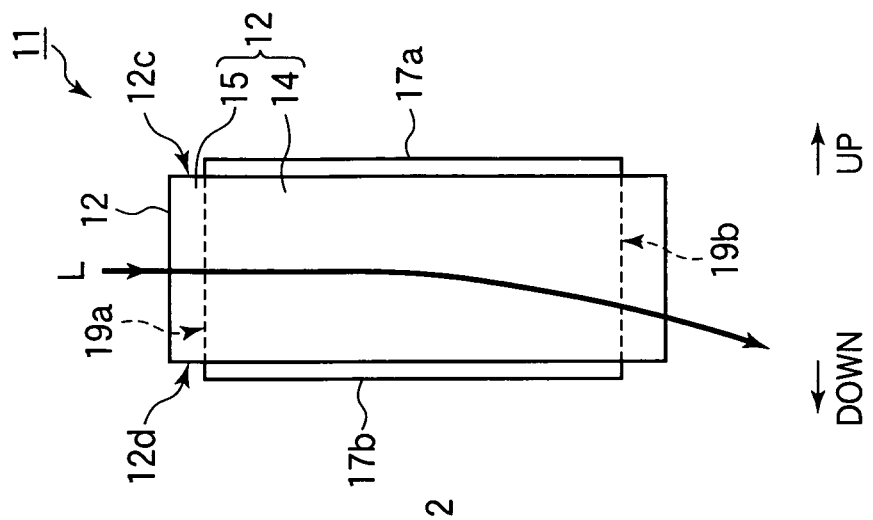
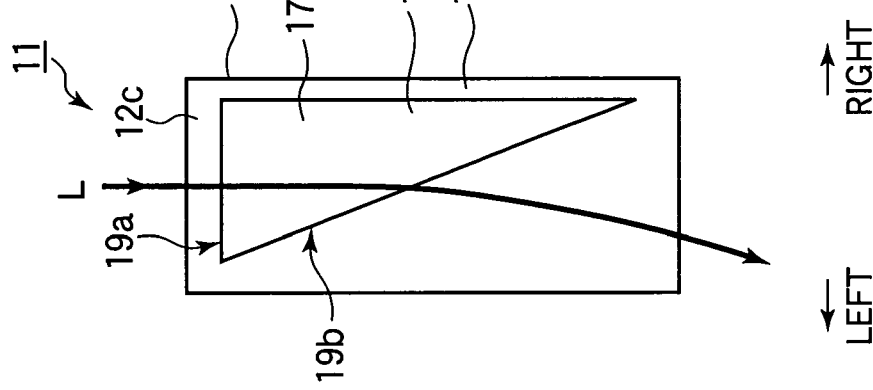
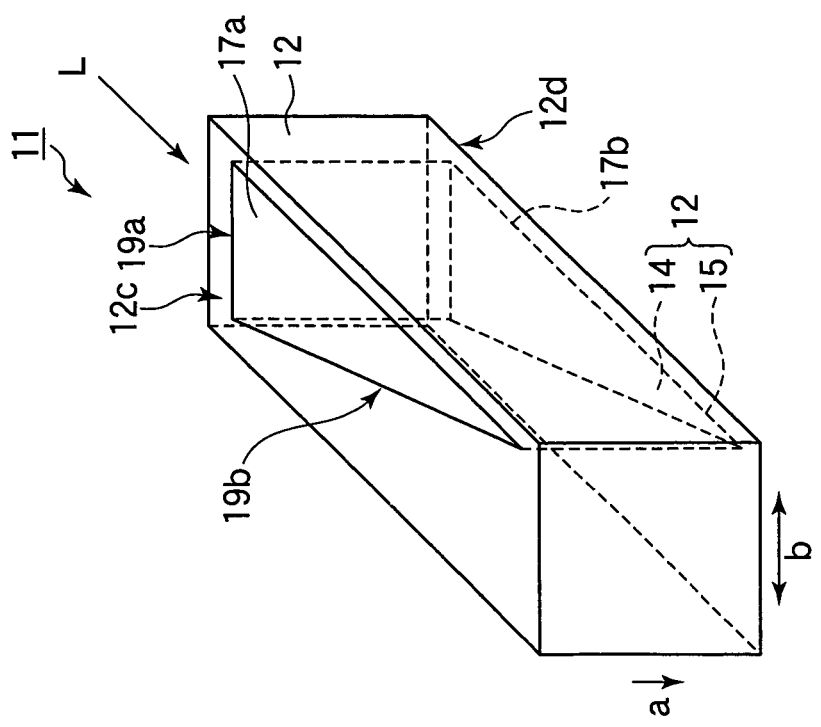

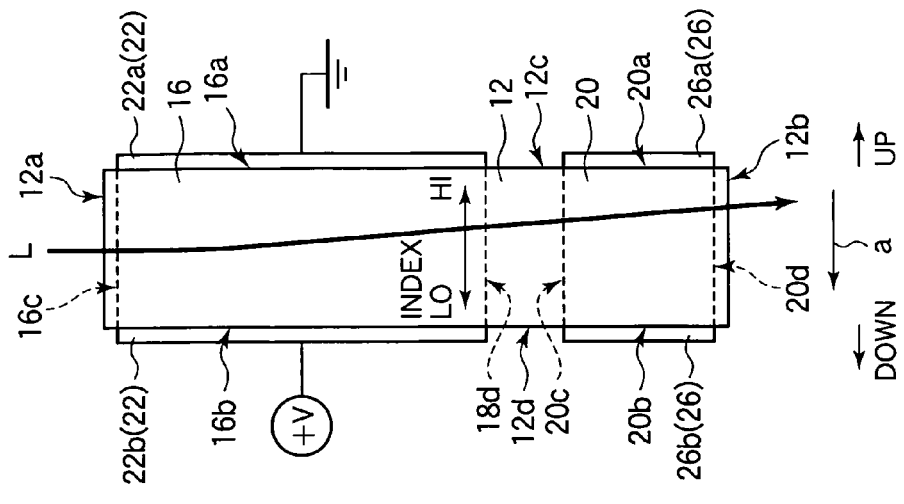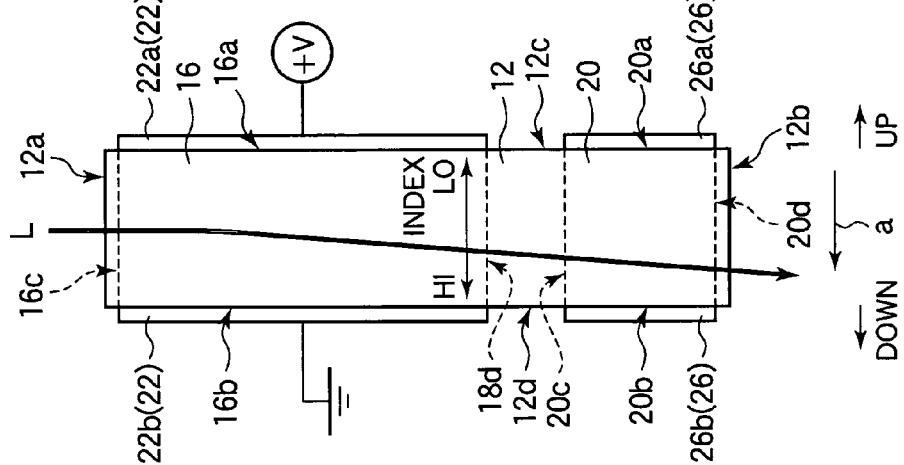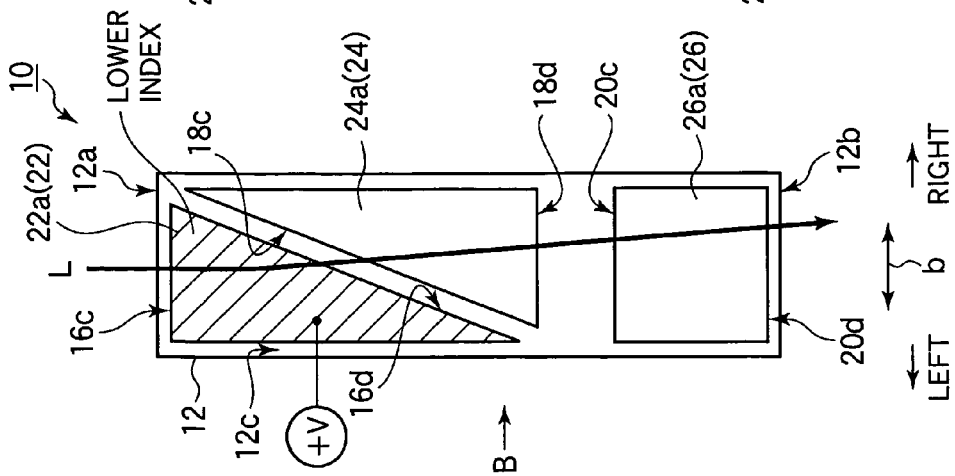

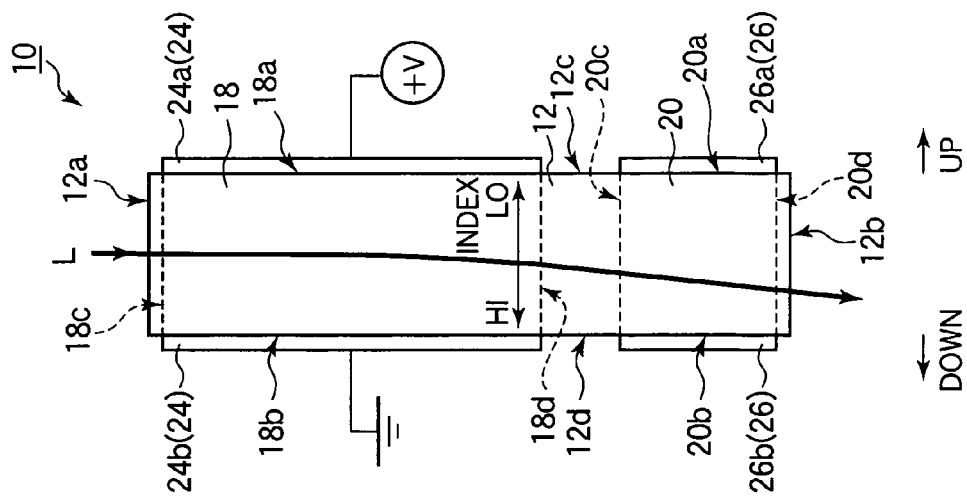
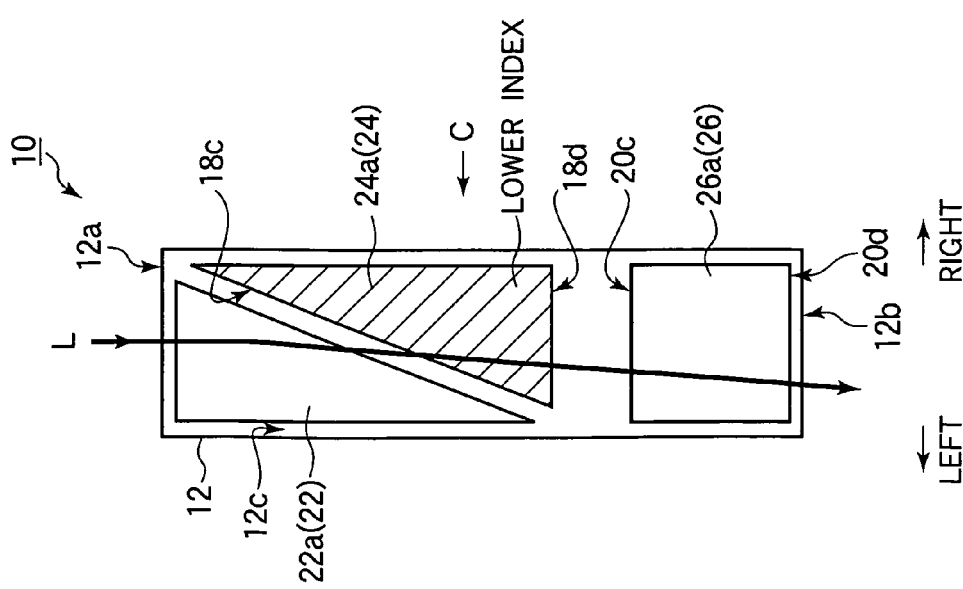

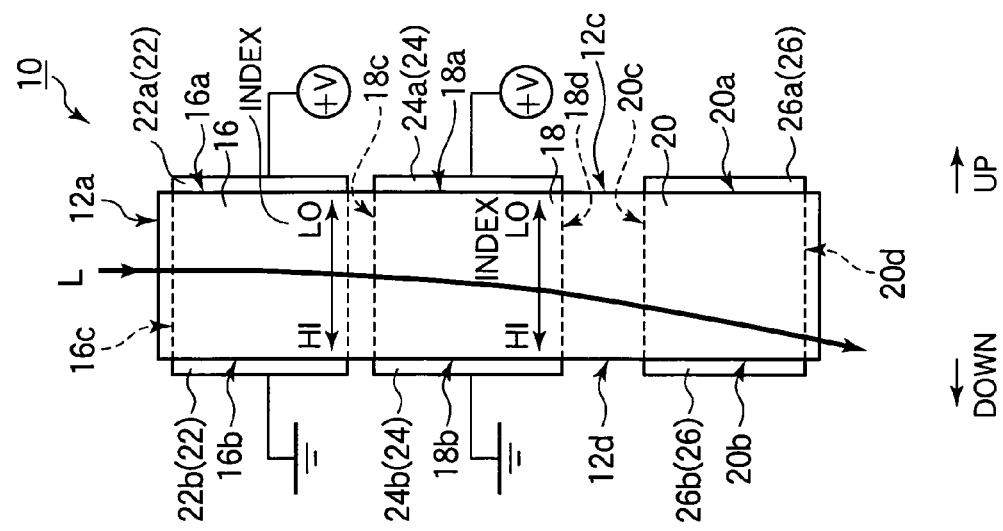
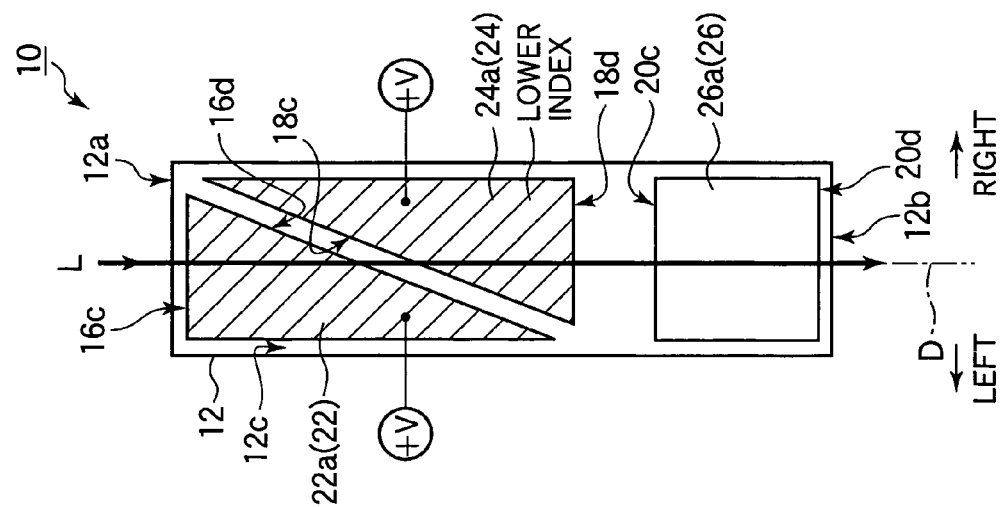

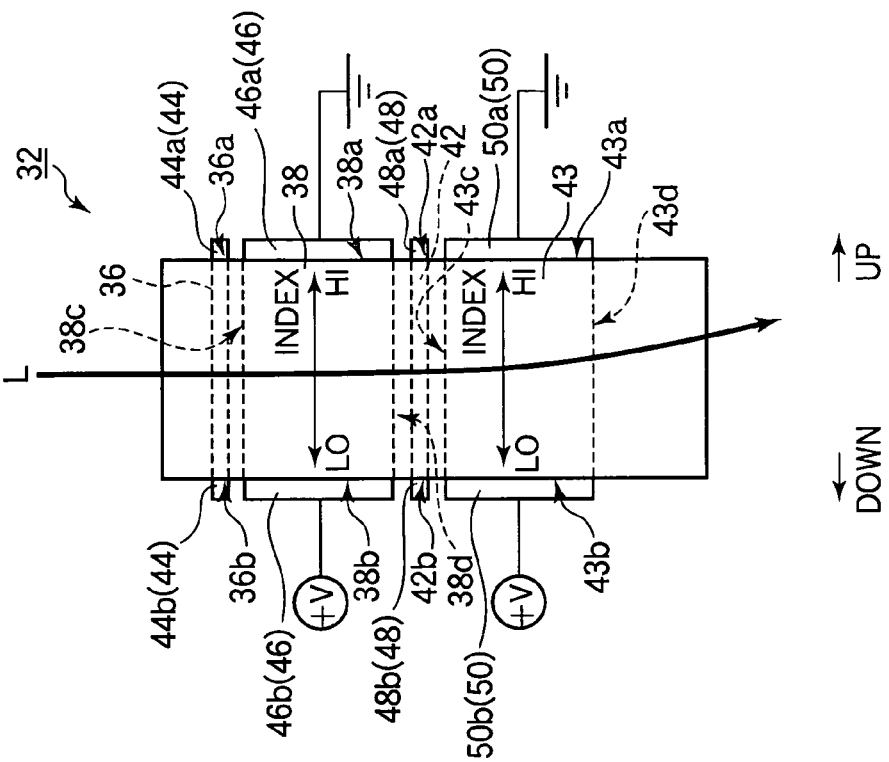
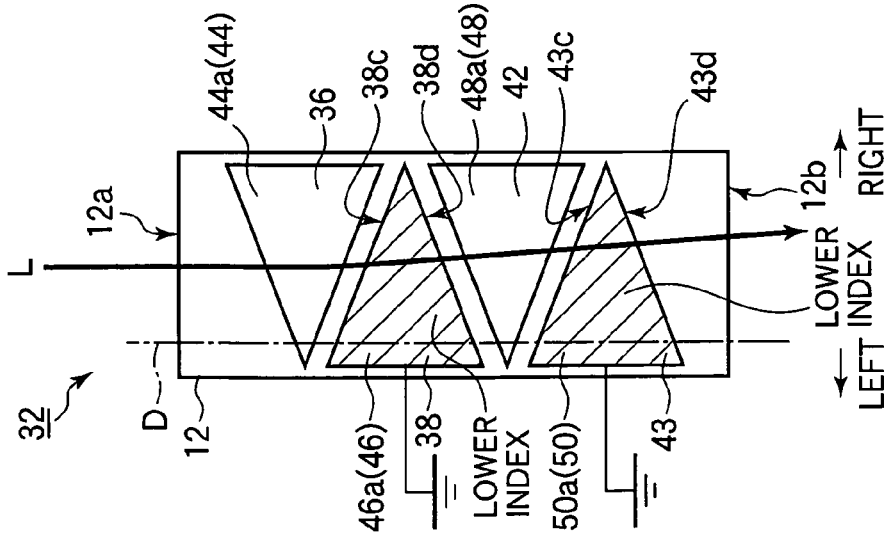

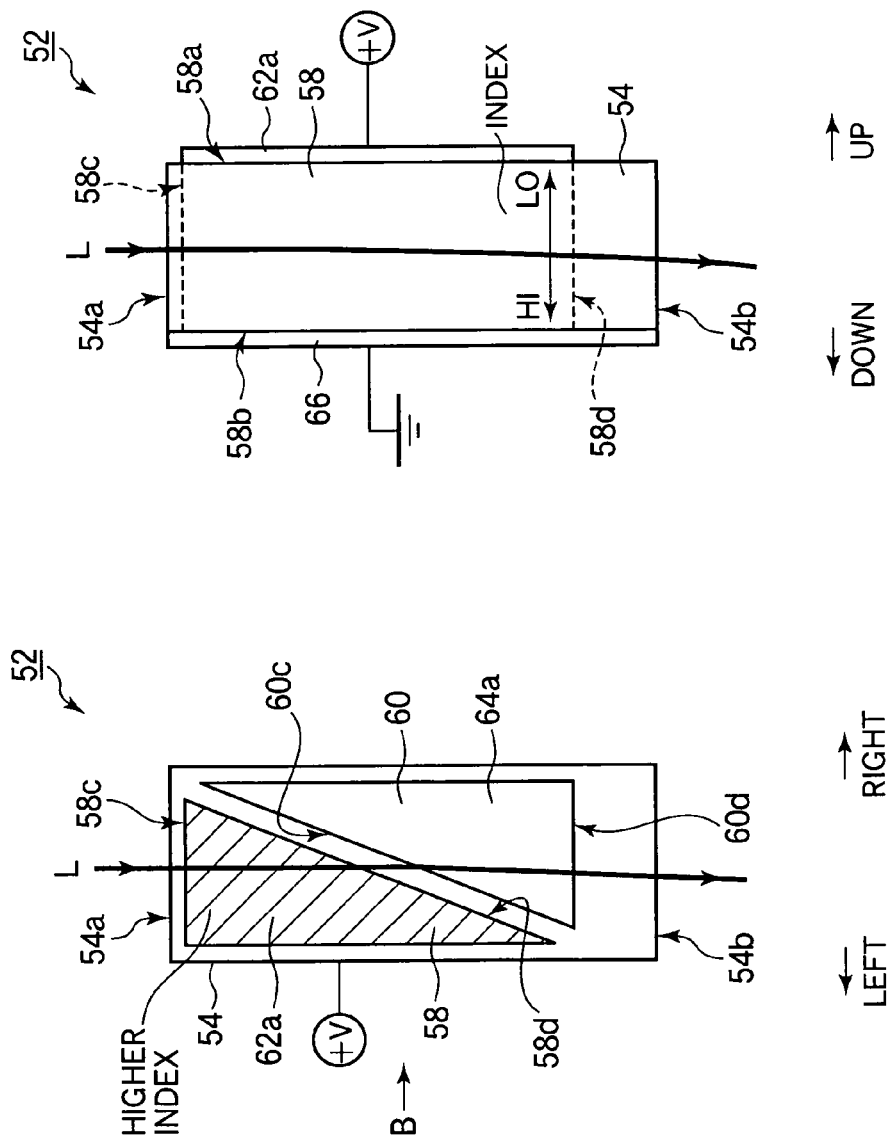

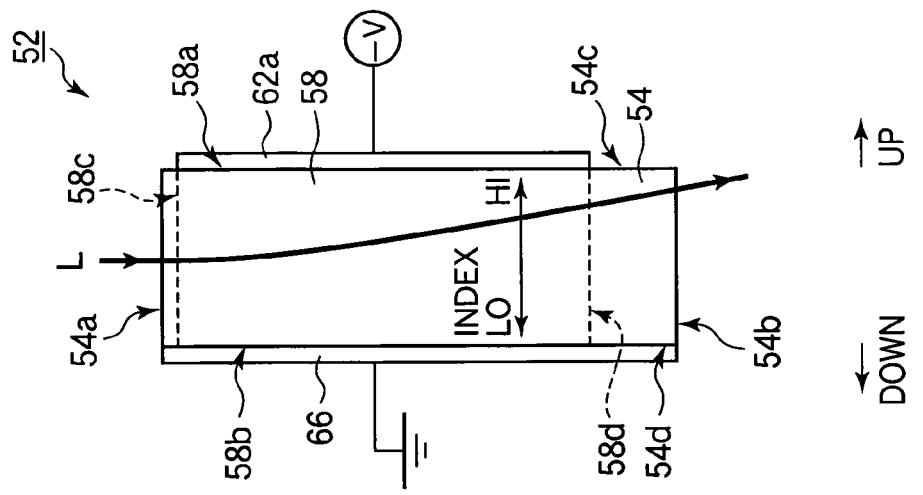
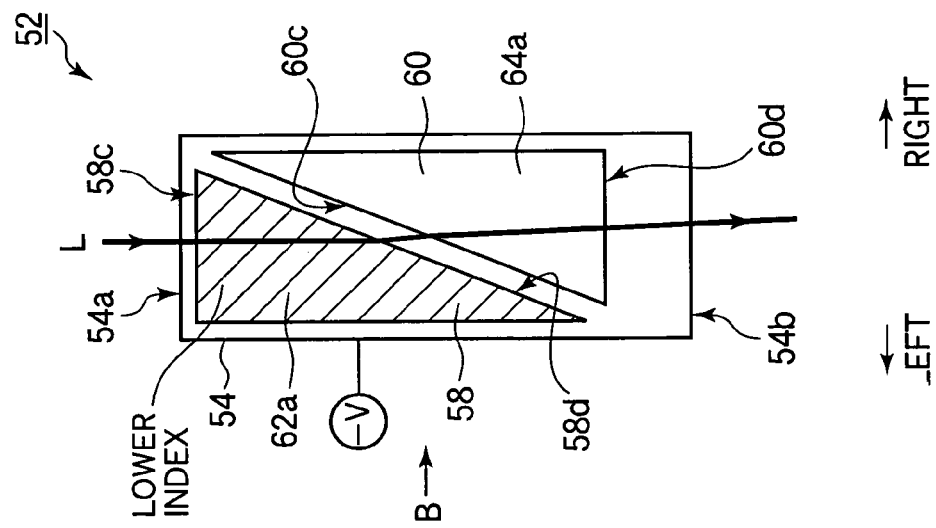

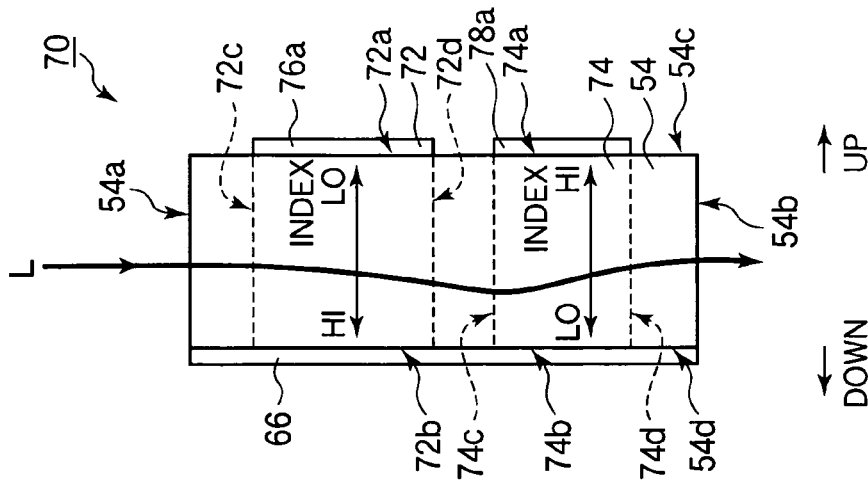
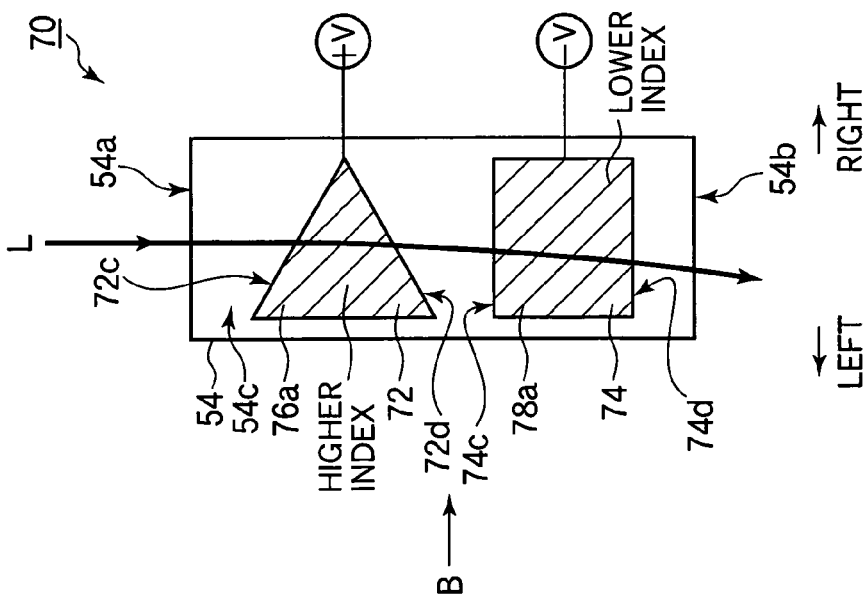

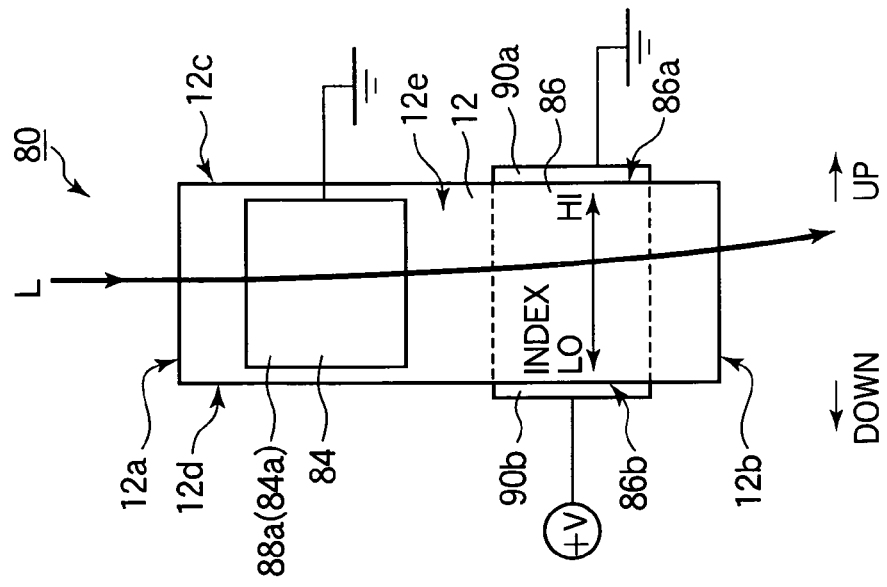
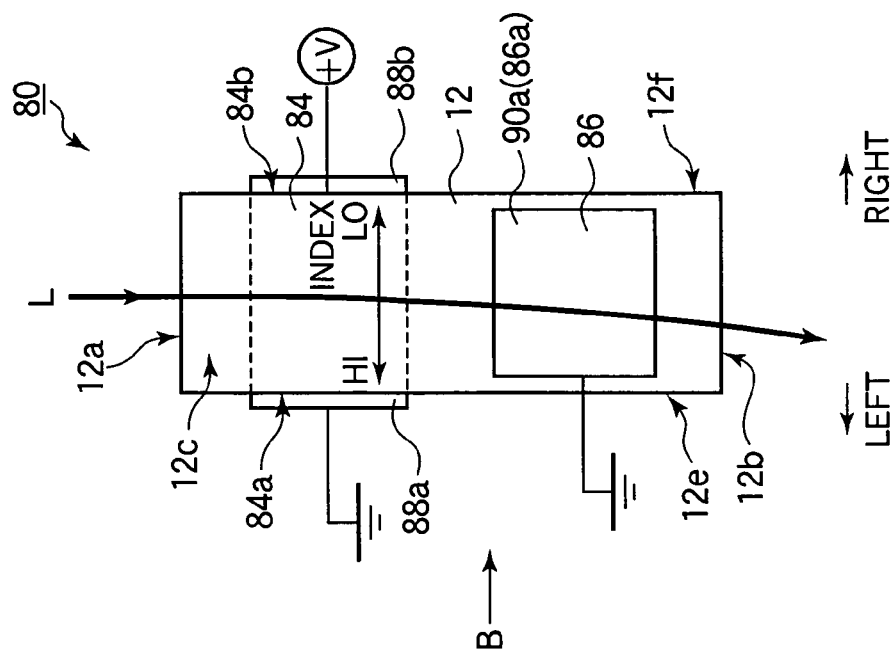

OPTICAL DEFLECTOR

BACKGROUND OF THE INVENTION

1. Field of the Invention

The present invention relates to an optical deflector capable of deflecting an input beam three-dimensionally and outputting the deflected beam.

2. Description of the Related Art

Technology for deflecting light beams is used in many fields, in devices such as scanning electron microscopes, laser printers, bar-code scanners, optical cross-connects, and so on.

Known methods of deflecting light beams make use of rotating mirrors, the acousto-optic effect, and the electro-optical effect. The optical cross-connects used in optical communication, for example, employ micro-electromechanical systems (MEMS) with micromirrors. These optical cross-connects are capable of switching up to a thousand channels by mechanically controlling the tilt angles of the micromirrors.

The optical deflectors implemented by MEMS technology, however, require mechanical driving of a mirror. Accordingly, it is impossible to shorten the switching time to less than about one millisecond (1 ms).

Deflection devices that operate by using the electro-optical effect are intrinsically faster. Known examples of such devices are disclosed in U.S. Pat. No. 6,449,084 to Guo and U.S. Pat. No. 6,947,625 to Nishizawa et al. A more recent technique deflects an optical beam by injecting a space charge into a dielectric body to create a refractive index distribution aligned with the resulting electric field, as described by Nakamura et al. in 'Wide-angle, low-voltage electro-optic beam deflection based on space-charge-controlled mode of electrical conduction in $KTa_{1-x}Nb_xO_3$', *Applied Physics Letters* 89, 131115 (2006).

A problem common to these known electro-optical deflectors is that they can only deflect light beams two-dimensionally, in a single plane including the incident beam.

SUMMARY OF THE INVENTION

An object of the present invention is to provide an optical deflector that can deflect and output an incident beam three-dimensionally.

In one aspect, the invention provides an optical deflector having an interaction region comprising an electro-optic material in which an applied electric field produces a refractive-index distribution that varies lineally in a first direction aligned with the electric field. Because of the refractive-index distribution, the optical deflector deflects a light beam by refraction in the first direction within the interaction region. In addition, the optical deflector deflects the light beam in a second direction orthogonal to the first direction by refraction at an interface where the light beam enters or leaves the interaction region. The light beam is thereby deflected three-dimensionally.

The deflection angle is controllable by varying the strength of the applied electric field.

In some embodiments, the refractive index of the electro-optic material varies by the Kerr effect and the interaction region comprises a first region, a second region, and a third region disposed in series the direction of propagation of the light beam.

The first region has a first surface at which the beam enters and a second surface from which the beam exits. The first surface and the second surface are mutually nonparallel.

The second region has a third surface at which the beam enters and a fourth surface from which the beam exits. The third surface and the fourth surface are mutually nonparallel.

The third region has a fifth surface at which the beam enters and a sixth surface from which the beam exits. The fifth surface and the sixth surface are mutually parallel.

The first surface is parallel to the fourth surface. The second surface is parallel to and faces the third surface.

The first region of the optical deflector preferably has a first facet and a second facet that are mutually parallel and orthogonal to both the first surface and the second surface, and have mutually congruent triangular shapes.

The second region preferably has a third facet and a fourth facet that are mutually parallel and orthogonal to both the third surface and the fourth surface, and have mutually congruent triangular shapes.

The first region, the second region, and a space between the second and third surfaces preferably combine to form a rectangular parallelepiped.

The third region preferably has a fifth facet and a sixth facet that are mutually parallel and orthogonal to both the fifth surface and the sixth surface. The third region preferably has the form of a rectangular parallelepiped.

The third region may comprise two sub-regions with shapes identical to the shapes of the first and second regions.

The optical deflector preferably further comprises first to sixth electrodes respectively disposed on the first to sixth facets.

In some other embodiments, the refractive index of the electro-optic material of the optical deflector varies by the Pockels effect and the interaction region comprises a first region and a second region disposed in series in the direction of propagation of the light beam.

The first region has a first surface at which the beam enters and a second surface from which the beam exits. The first surface and the second surface are mutually nonparallel.

The second region has a third surface at which the beam enters and a fourth surface from which the beam exits. One of the following two conditions is satisfied.

Condition 1: the first surface is parallel to the fourth surface and the second surface is parallel to and faces the third surface.

Condition 2: the third surface is parallel to the fourth surface.

The first region preferably has a first facet and a second facet that are mutually parallel and orthogonal to both the first surface and the second surface. The second region preferably has a third facet and a fourth facet that are mutually parallel and orthogonal to both the third surface and the fourth surface. The first and third facets are disposed in one major surface of the electo-optic material, while the second and fourth facets are disposed in the opposite major surface of the electro-optic material.

When condition 1 is satisfied, the first and second regions may have mutually congruent triangular prismatic shapes, the second and third surfaces may be mutually facing, and the first region, the second region, and a space between the second and third surfaces may combine to form a parallelepiped. The interaction region may further comprise a third region and a fourth region respectively identical in shape and orientation to the first region and second region, the third region and fourth region being disposed in series in the direction of propagation of the light beam.

When condition 2 is satisfied, the first and second facets may be triangular, so that the first region is a triangular prism, and the third and fourth facets may be rectangular, so that the second region is a rectangular parallelepiped.

In either case, the optical deflector may have first to fourth electrodes disposed respectively on the first to fourth facets. Alternatively, the optical deflector may have a first electrode disposed on the first facet, a second electrode disposed on the third facet, and a third electrode disposed on the opposite major surface of the electro-optic material, facing both the first and second electrodes.

To cause the refractive index to change linearly in the direction of the electric field, the electro-optic material forming the optical deflector may have a varying composition, or a varying ratio of domains with a first polarization or crystal geometry to domains with a second polarization or crystal geometry.

An array of optical deflectors of any of the above types may be formed in a slab of electro-optic material.

In another aspect, the invention provides an optical deflector having an interaction region comprising an electro-optic material in which an applied electric field produces a refractive-index distribution that varies linearly in the direction of the applied electric field by the Kerr effect. The interaction region comprises a first region and a second region to which electric fields are applied in mutually orthogonal directions. The optical deflector deflects a light beam three-dimensionally by refraction one direction in the first region and refraction an orthogonal direction in the second region. The direction and amount of deflection are controllable by varying the strengths of the applied electric fields, and the angle of incidence of the light beam.

BRIEF DESCRIPTION OF THE DRAWINGS

In the attached drawings:

FIG. 1 is a perspective view of an optical deflector model with a minimal configuration according the present invention;

FIG. 2 is a plan view of the optical deflector model in FIG. 1;

FIG. 3 is a side view of the optical deflector model in FIG. 1;

FIG. 5 is a plan view of the optical deflector in the first embodiment, showing an optical transmission path;

FIGS. 6 and 7 are side views of the optical deflector viewed from the direction of arrow B in FIG. 5;

FIG. 8 is a plan view of the optical deflector, showing an optical transmission path in the first embodiment;

FIG. 9 is a side view of the optical deflector viewed from the direction of arrow C in FIG. 8;

FIG. 10 is a plan view of the optical deflector, showing an optical transmission path in the first embodiment;

FIG. 11 is a sectional view of the optical deflector along line D in FIG. 10;

FIG. 21 is a plan view of the optical deflector, showing another optical transmission path in the second embodiment;

FIG. 22 is a sectional view of the optical deflector along line D in FIG. 21;

FIG. 24 is a plan view of the optical deflector, showing an optical transmission path in the third embodiment;

FIG. 25 is a side view of the optical deflector viewed from the direction of arrow B in FIG. 24;

FIG. 26 is a plan view of the optical deflector, showing another optical transmission path in the third embodiment;

FIG. 27 is a side view of the optical deflector viewed from the direction of arrow B in FIG. 26;

FIG. 39 is a plan view of the optical deflector, showing another optical transmission path in the fourth embodiment;

FIG. 40 is a side view of the optical deflector viewed from the direction of arrow B in FIG. 39;

FIG. 44 is a plan view of the optical deflector, showing another optical transmission path in the fifth embodiment; and FIG. 45 is a side view of the optical deflector viewed from the direction of arrow B in FIG. 44.

DETAILED DESCRIPTION OF THE INVENTION

Figure 4:
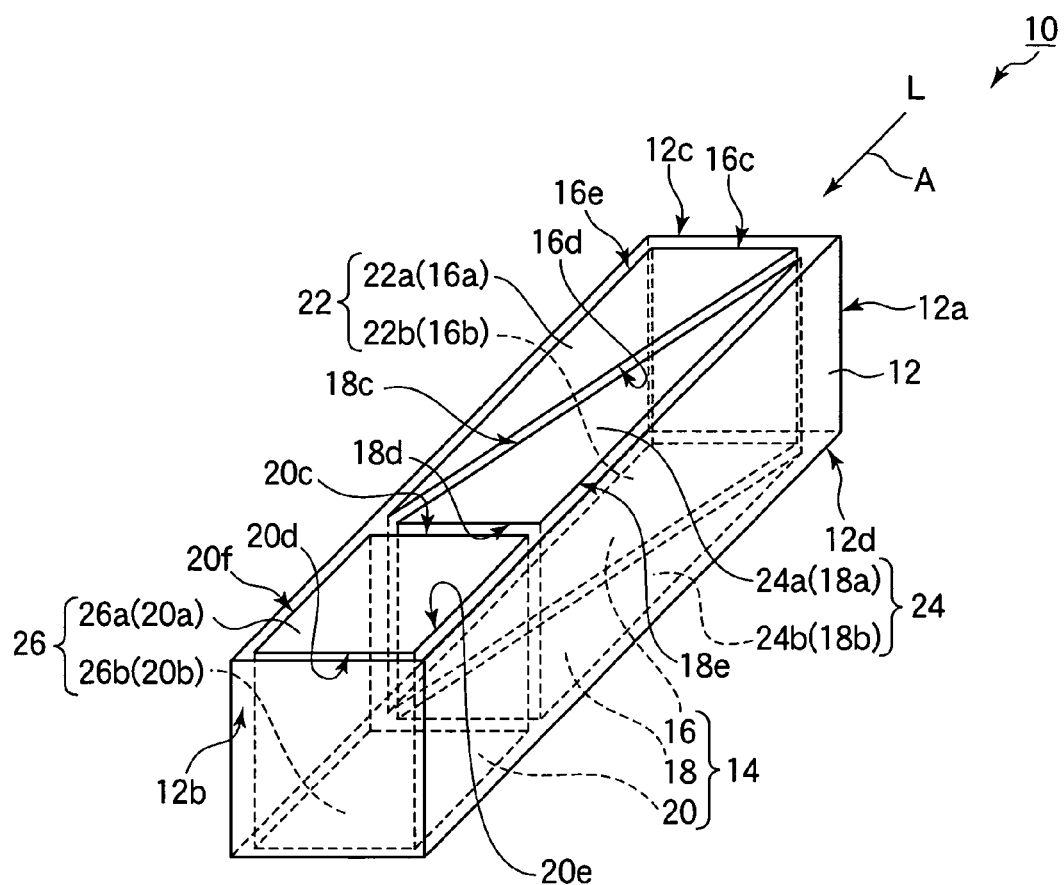
FIG. 4 is a perspective view showing the general structure of the optical deflector in a first embodiment of the invention.

Illustrative embodiments of the invention will now be described with reference to the attached drawings, in which like elements are indicated by like reference characters. The drawings are schematic, and the invention is not limited to the configurations shown in the drawings, or the dimensions and materials mentioned in the description.

Before the embodiments are described, a model optical deflector with a minimal configuration in accordance with the invention will be described. In this model, there is only one interaction region. The model is shown in perspective view in FIG. 1, in plan view in FIG. 2, and in side view in FIG. 3.

The model optical deflector 11 is formed in an electro-optic material 12 comprising an interaction region 14 and a non-interaction region 15.

The interaction region 14 is a part of the electro-optic material 12 across which an external voltage is applied, creating an electric field. The refractive index of the electro-optic material 12 varies linearly in the direction of the electric field, at a rate that increases as the applied voltage is increased. The interaction region 14 is defined by the shape of the electrodes that generate the electric field. In this model, these electrodes 17a, 17b have congruent right triangular shapes, and the interaction region 14 has the shape of a right triangular prism extending between two major surfaces 12c, 12d of the electro-optic material 12. The non-interaction region 15 comprises all parts of the electro-optic material 12 not disposed within this prism.

Application of appropriate voltages to the electrodes 17a, 17b generates an electric field in the interaction region 14, directed from the first or upper major surface 12c of the electro-optic material 12 toward the second or lower major surface 12d. The refractive index of the interaction region 14 accordingly varies linearly from the upper major surface 12c to the lower major surface 12d. The direction from the upper major surface 12c to the lower major surface 12d, marked by the letter 'a' in FIG. 1, will be referred to as the depth direction. Directions parallel to major surfaces 12c and 12d, such as the directions marked 'b' in FIG. 1, will be referred to as horizontal directions.

The interaction region 14 has an entry interface 19a through which a light beam L enters the interaction region 14 and an exit interface 19b through which the light beam leaves the interaction region 14. In this model, the entry interface 19a is normal (orthogonal) to the direction of propagation of the incident light L, while the exit interface 19b is oriented at an oblique angle to the light propagation direction.

When voltage is applied, due to the change in refractive index of the interaction region 14, a difference in refractive index arises between the interaction region 14 and the non-interaction region 15. As a result, the light L is refracted horizontally at the exit interface 19b, as shown in FIG. 2. The horizontal deflection angle of the light can be varied by changing the applied voltage.

If the entry interface 19a were not normal to the incident light beam, the light would also be refracted at the entry interface 19a. In general, the light beam L may be refracted at either the entry interface 19a or the exit interface 19b or at both interfaces.

The linearly varying refractive index in the interaction region 14 also causes the light beam L to bend in the direction of increasing index within the interaction region 14. The light beam L is accordingly deflected (refracted) in the depth direction, as shown in FIG. 3. Like the horizontal deflection angle, the depth deflection angle can be varied by changing the applied voltage.

In the model optical deflector 11, accordingly, the application of a voltage deflects the incident light beam both horizontally and in the depth direction. That is, the light is deflected three-dimensionally. In the following embodiments, a plurality of interaction areas are provided to provide greater control over the direction in which the light is deflected. In some of the embodiments, the applied voltage causes the refractive index in the interaction region to vary by the Kerr effect, while in other embodiments the Pockels effect is used.

First Embodiment

An optical deflector according to the first embodiment will be described with reference to FIGS. 4 to 14.

FIG. 4 is a perspective view showing the general structure of the optical deflector. For simplicity, electrodes in FIG. 4 are depicted as having no thickness.

The optical deflector 10 is a block of an electro-optic material 12. The interaction region 14 consists of three mutually separated regions: a first region 16, a second region 18, and a third region 20.

The block of electro-optic material 12 is a rectangular solid having two end facets 12a, 12b with a flat square shape. Light L propagating in the direction of arrow A enters the electro-optic material 12 at end facet 12a. Deflected light exits the electro-optic material 12 from the opposite end facet 12b, having passed through the first region 16, second region 18, and third region 20 in this sequence.

The electro-optic material 12 has a first or upper major surface 12c on which first to third front electrodes 22a, 24a, 26a are formed and a second or lower major surface 12d on which first to third back electrodes 22b, 24b, 26b are formed. The direction perpendicular to the major surfaces 12c, 12d, that is, the direction from the upper major surface 12c to the lower major surface 12d, will be referred to below as the depth direction (a). Directions perpendicular to the depth direction, that is, directions in any plane parallel to the upper major surface 12c, will be referred to as horizontal (b).

The electro-optic material 12 is formed of a material the refractive index of which can be changed linearly by an electric field applied in the depth direction. In this embodiment, 'linearly' means that the refractive index of the electro-optic material 12 is a linear function of distance from the upper major surface 12c.

According to the Kerr effect, the linear change in refractive index of the material of which the electro-optic material 12 is made is proportional to the square of the intensity of the applied electric field. The change in refractive index is due to the injection of electrical charge by the electric field. An exemplary preferred material for the electro-optic material 12 is potassium tantalum niobate ($KTa_{1-x}Nb_xO_3$, where $0 \leq x \leq 1$).

The first front electrode 22a and first back electrode 22b form a first electrode pair 22. The first front electrode 22a is a flat right triangle disposed on the upper major surface 12c. The part of the upper major surface 12c below the first front electrode 22a forms the first facet or upper facet 16a of the first region 16.

The first back electrode 22b is congruent in shape to the first front electrode 22a and is disposed on the lower major surface 12d, in an area that forms an orthographic projection of the first front electrode 22a. The part of the lower major surface 12d above the first back electrode 22b forms the second facet or lower facet 16b of the first region 16.

The first region 16 is accordingly a right triangular prismatic region in the electro-optic material 12 disposed between the first front electrode 22a and the first back electrode 22b, that is, between the upper facet 16a and lower facet 16b.

The first region 16 has a first surface 16c or incident boundary interface through which light L enters the first region 16. The first surface 16c is disposed near the incident end facet 12a of the electro-optic material 12 and is parallel to the incident end facet 12a. In this exemplary structure, the incident light beam L is normal to the first surface 16c.

The first region 16 also has a second surface 16d or exit boundary interface through which light L leaves the first region 16. As seen from the first surface 16c, the second surface 16d extends at an oblique angle toward the exit end facet 12b of the electro-optic material 12, following the hypotenuse of the right triangular first front electrode 22a. The second surface 16d is not parallel to the first surface 16c, and is not normal to the direction of propagation of the light beam L.

The first region 16 also has a side surface 16e that extends parallel to a side facet of the block of the electro-optic material 12.

The second front electrode 24a and second back electrode 24b form a second electrode pair 24. The second front electrode 24a is a flat right triangle disposed on the upper major surface 12c. The part of the upper major surface 12c below the second front electrode 24a forms the third facet or the upper facet 18a of the second region 18.

The second back electrode 24b is congruent to the second front electrode 24a and is disposed on the lower major surface 12d, in an area that forms an orthographic projection of the second front electrode 24a. The part of the lower major surface 12d above the second back electrode 24b forms the fourth facet or the lower facet 18b of the second region 18.

The second region 18 has a third surface 18c or incident boundary interface through which light L enters the second region 18. The third surface 18c parallels the second surface 16d of the first region 16 and faces the incident end facet 12a of the electro-optic material 12 at an oblique angle, following the hypotenuse of the right-triangular second front electrode 24a. Light entering the second region 18 from the first region 16 crosses the third surface 18c at an oblique angle.

The second region 18 also has a fourth surface 18d or exit boundary interface through which light L leaves the second region 18. The fourth surface 18d is parallel to and faces the exit end facet 12b of the electro-optic material 12, and is not parallel to the third surface 18c.

The second region 18 also has a side surface 18e that extends parallel to a side facet of the electro-optic material 12.

The second region 18 has the form of a right triangular prism congruent to the right triangular prism formed by the first region 16. The first surface 16c of the first region 16 and the fourth surface 18d of the second region 18 are mutually parallel. The second surface 16d of the first region 16 and the third surface 18c of the second region 18 are mutually parallel and face each other. Taken together, the first region 16, the second region 18, and the space between them essentially form two halves of a rectangular parallelepiped.

The third front electrode 26a and third back electrode 26b form a third electrode pair 26. The third front electrode 26a is a flat rectangle disposed on the upper major surface 12c. The part of the upper major surface 12c below the third front electrode 26a forms the fifth facet or the upper facet 20a of the third region 20.

The third back electrode 26b is congruent to the third front electrode 26a and is disposed on the lower major surface 12d, in an area that forms an orthographic projection of the third front electrode 26a. The part of the lower major surface 12d above the third back electrode 26b forms the sixth facet or the lower facet 20b of the third region 20.

The third region 20 forms a rectangular parallelepiped or rectangular prism within the electro-optic material 12, disposed between the third front electrode 26a and the third back electrode 26b.

The third region 20 has a fifth surface 20c or incident boundary interface through which light L enters, and a sixth surface 20d or exit boundary interface through which light L exits. The fifth surface 20c is parallel to and faces toward the incident end facet 12a of the electro-optic material 12. The sixth surface 20d is parallel to and faces toward the exit end facet 12b of the electro-optic material 12. The fifth surface 20c and sixth surface 20d are mutually parallel.

The front electrodes 22a, 24a, 26a and back electrodes 22b, 24b, 26b make ohmic contact with the first to third regions 16, 18, 20 so that they can inject charge effectively into these regions. The front electrodes 22a, 24a, 26a and back electrodes 22b, 24b, 26b are preferably made from a metal such as titanium (Ti) or chromium (Cr) having a work function that does not differ greatly from the work function of the electro-optic material 12.

Next the operation of the optical deflector 10 will be described.

First the operation when a voltage is applied only to the first electrode pair 22 will be described. This operation is shown in plan view in FIG. 5 and in side view FIGS. 6 and 7, looking from the direction of arrow B in FIG. 5.

In this operation, a positive voltage (+V) is applied to the first front electrode 22a and the first back electrode 22b is grounded. No voltage is applied across the second and third electrode pairs 24, 26. The regions between the second and third electrode pairs 24, 26 become non-interaction regions with a constant refractive index since no electric field is present in them. In the first region 16, the refractive index varies as follows.

The applied voltage injects electrons into the electro-optic material 12 from the first back electrode 22b, thereby reducing the electric field near the first back electrode 22b so that the electric field increases from the first back electrode 22b toward the first front electrode 22a. Because of the Kerr effect, the electric field reduces the refractive index, so the refractive index in the first region 16 is lower than in the surrounding non-interaction region, as indicated by the 'LOWER INDEX' notation and hatching in FIG. 5. The refractive index increases linearly from the first front electrode 22a to the first back electrode 22b, as indicated by the 'HI' and 'LO' notations on the 'INDEX' arrow in FIG. 6.

Because the refractive index is lower in the first region 16 than in the surrounding parts of the electro-optic material 12, when light L exits the first region 16 through its second surface 16d, the light is refracted, that is, deflected, to the right as shown in FIG. 5. No refraction or deflection occurs at the first surface 16c, because this surface is normal to the incident light beam.

In addition, because of the refractive index gradient in the first region 16, as the light beam L passes through the first region 16 it is deflected in the depth direction as shown in FIG. 6. The deflection is in the direction of increasing refractive index, that is, toward the first back electrode 22b. This deflection is orthogonal to the horizontal deflection in FIG. 5. Having been deflected in two mutually orthogonal directions, the light exiting the first region 16 has been deflected three-dimensionally.

Since no voltage is applied to the second and third electrode pairs 24, 26 in FIGS. 5 and 6, the light beam passes straight through the second and third regions 18, 20 without undergoing further deflection.

If the electric field is reversed as shown in FIG. 7, by applying a positive voltage to the first back electrode 22b and grounding the first front electrode 22a, then the same horizontal deflection occurs as shown in FIG. 5, but the direction of depth deflection is reversed. The refractive index now decreases linearly from the first front electrode 22a to the first back electrode 22b, so the light beam is now deflected toward the first front electrode 22a.

Next the operation when a voltage is applied only to the second electrode pair 24 will be described. This operation is shown in plan view in FIG. 8 and in side view FIG. 9, looking from the direction of arrow C in FIG. 8. No voltage is applied to the first and third electrode pairs 22, 26. Now the regions between the first and third electrode pairs 22, 26 become non-interaction regions with a constant refractive index since no electric field is present in them. In the second region 18, the refractive index varies in the same way as when a voltage is applied to the first electrode pair 22.

If a positive voltage is applied to the second front electrode 24a and the second back electrode 24b is grounded, the resulting charge injection and the Kerr effect cause the refractive index in the second region 18 to increase linearly from the second front electrode 24a to the second back electrode 24b, as indicated in FIG. 9, while the refractive index in the second region 18 as a whole becomes lower than in the surrounding parts of the electro-optic material 12. Accordingly, light L entering the second region 18 through the third surface 18c is refracted or deflected to the left in FIG. 8. When the light L exits the second region 18 from the fourth surface 18d, it is again deflected to the left. In this case the light beam L is deflected horizontally at both the third surface 18c or incident boundary interface and the fourth surface 18d or exit boundary interface.

Light L passing through the second region 18 is also refracted downward in the depth direction as shown in FIG. 9 because of the refractive index distribution in the second region 18. This depth deflection is similar to the depth deflection shown in FIG. 6.

Though not illustrated in the drawings, the behavior of the second region 18 if the second front electrode 24a is grounded and a positive voltage is applied to the second back electrode 24b is similar to the behavior of the first region 16. That is, the horizontal deflection of the light beam is the same as in FIG. 8, but the depth deflection is opposite to the deflection in FIG. 9: the light L is deflected upward toward the 24a.

Next the operation when the same voltage is applied in the same direction to both the first and second electrode pairs 22, 24 will be described. This operation is shown in plan view in FIG. 10 and in the sectional view FIG. 11 taken along line D in FIG. 10. No voltage is applied to the third electrode pair 26, so the region between the third electrode pair 26 is a non-interaction region with no electric field and a constant refractive index.

In FIGS. 10 and 11, a positive voltage is applied to the first and second front electrodes 22a, 24a and the first and second back electrodes 22b, 24b are grounded.

Referring to FIG. 10, the triangular prisms of the first region 16 and second region 18 and the space between them combine to form an essentially rectangular parallelepiped having flat square ends 16c and 18d. Incident light L enters and leaves this parallelepipedical region without being deflected horizontally.

As indicated in FIG. 11, light L is deflected in the depth direction in both the first and second regions 16, 18. Light L is thus deflected at a larger angle in the depth direction than when either the first region 16 or second region 18 is used alone.

Though not illustrated in the drawings, when a voltage is applied in the reverse direction, that is, when the first and second front electrodes 22a, 24a are grounded and a positive voltage is applied to the first and second back electrodes 22b, 24b, the light L is deflected upward in the depth direction, opposite to the direction indicated in FIG. 11. That is, the light beam L is deflected at a comparatively large angle toward the first and second front electrodes 22a, 24a, without being deflected horizontally.

Next the operation when a prescribed voltage is applied to the first and third electrode pairs 22, 26 will be described with reference to FIGS. 12 to 14. This operation is shown in plan view in FIG. 12 and in side views in FIGS. 13 and 14, looking from the direction of arrow B in FIG. 12.

Figure 12:
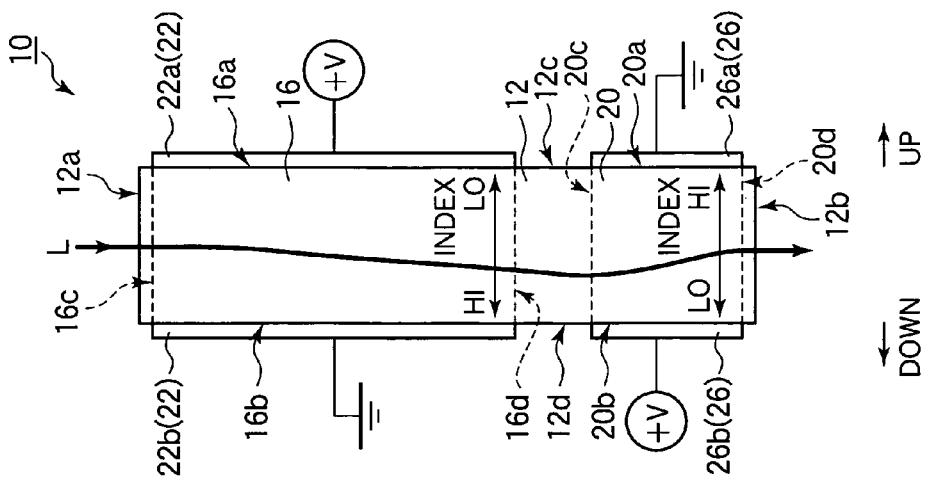
FIG. 12 is a plan view of the optical deflector, showing an optical transmission path in the first embodiment.

As indicated in FIG. 12, in the third region 20, the fifth surface 20c, which is the incident interface, and the sixth surface 20d, which is the exit interface, are mutually parallel. Accordingly, the light beam L is not deflected horizontally in the third region 20. The third region 20 deflects light L only in the depth direction.

Figures 13, 14:
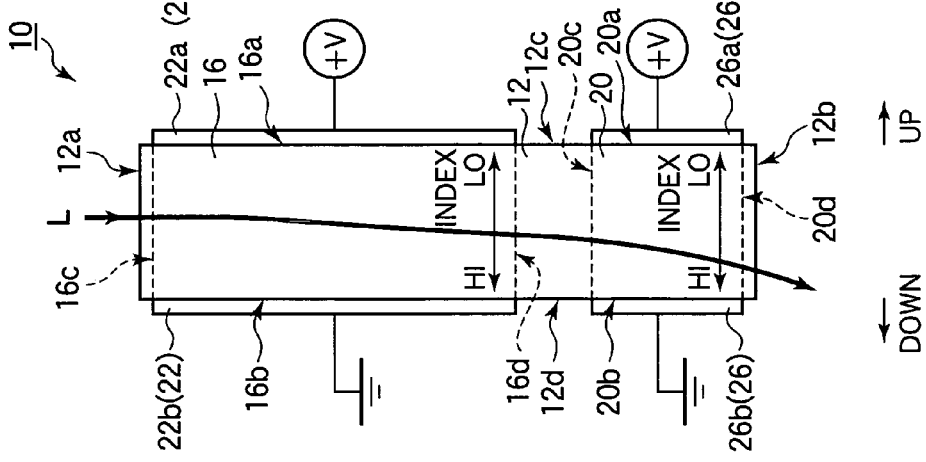
FIGS. 13 and 14 are side views of the optical deflector viewed from the direction of arrow B in FIG. 12.

In FIG. 13, the voltages applied across the first and third electrode pairs 22, 26 are identical in magnitude and direction. More specifically, identical positive voltages are applied to the first and third front electrodes 22a, 26a and the first and third back electrodes 22b, 26b are grounded.

In this case, as indicated in FIGS. 12 and 13, incident light L is deflected downward and to the right in the first region 16 and enters the third region 20. The light beam L passes through the third region 20 without further horizontal deflection, but is again deflected downward in the depth direction, because the third region 20 and the first region 16 have the same refractive index gradient, increasing from the upper major surface 12c to the lower major surface 12d. The total effect of the combined action of the first and third regions 16, 20 is to deflect the light beam L by a moderate amount horizontally (to the right) and by a large amount in the depth direction (downward).

In FIG. 14, opposite voltages are applied across the first and third electrode pairs 22, 26: a positive voltage is applied to the first front electrode 22a and the first back electrode 22b is grounded; the third front electrode 26a is grounded and a positive voltage is applied to the third back electrode 26b.

The refractive index distributions in the third region 20 and first region 16 are now mutually opposite. Accordingly, light L that has been deflected downward toward the lower major surface 12d in the first region 16 is deflected upward toward the upper major surface 12c in the third region 20. The result is that the light beam L exits the optical deflector 10 with no net deflection in the depth direction.

As described above, the optical deflector 10 in the first embodiment has a simple structure with electrodes on only its upper and lower major surfaces 12c, 12d, but can deflect light L three-dimensionally: in the horizontal direction, the depth direction, or both the horizontal and depth directions.

Since the electrodes are located only on the upper major surface 12c and lower major surface 12d of the electro-optic material 12, the optical deflector 10 can be mass-produced at a low cost by conventional semiconductor fabrication methods, such as photolithography.

If the first, second, and third front electrodes 22a, 24a, 26a are too close to each other, interference effects may occur among the applied voltages. This is also true of the first, second, and third back electrodes 22b, 24b, 26b. To avoid such voltage interference, the first, second, and third front electrodes 22a, 24a, 26a are preferably separated from each other by a distance greater than the thickness (the depth dimension) of the electric optical material forming them. The same separation should naturally be provided for the first, second, and third back electrodes 22b, 24b, 26b.

If it would be difficult to separate the first, second, and third front electrodes 22a, 24a, 26a or the first, second, and third back electrodes 22b, 24b, 26b by the necessary amount, grooves may be provided between the electrodes to avoid voltage interference. The grooves can be formed easily by conventional semiconductor fabrication techniques such as dicing or dry etching.

Although the optical deflector 10 in this embodiment has three electrode pairs 22, 24, 26, the number of electrode pairs is a design choice and is not limited to three.

In order to obtain substantially the same deflection in the depth direction in the third region 20 as in the first region 16 and second region 18, the length of the third electrode pair 26 in the light propagation direction may be shorter than the combined length of the first electrode pair 22 and second electrode pair 24 in this direction. More specifically, the length of the third electrode pair 26 in the light propagation direction may be the same as the distance through which the light actually propagates in the first region 16 or the second region 18: for example, half the length of the first region 16 or second region 18.

Next, a deflector array based on the first embodiment will be described.

Figure 15:
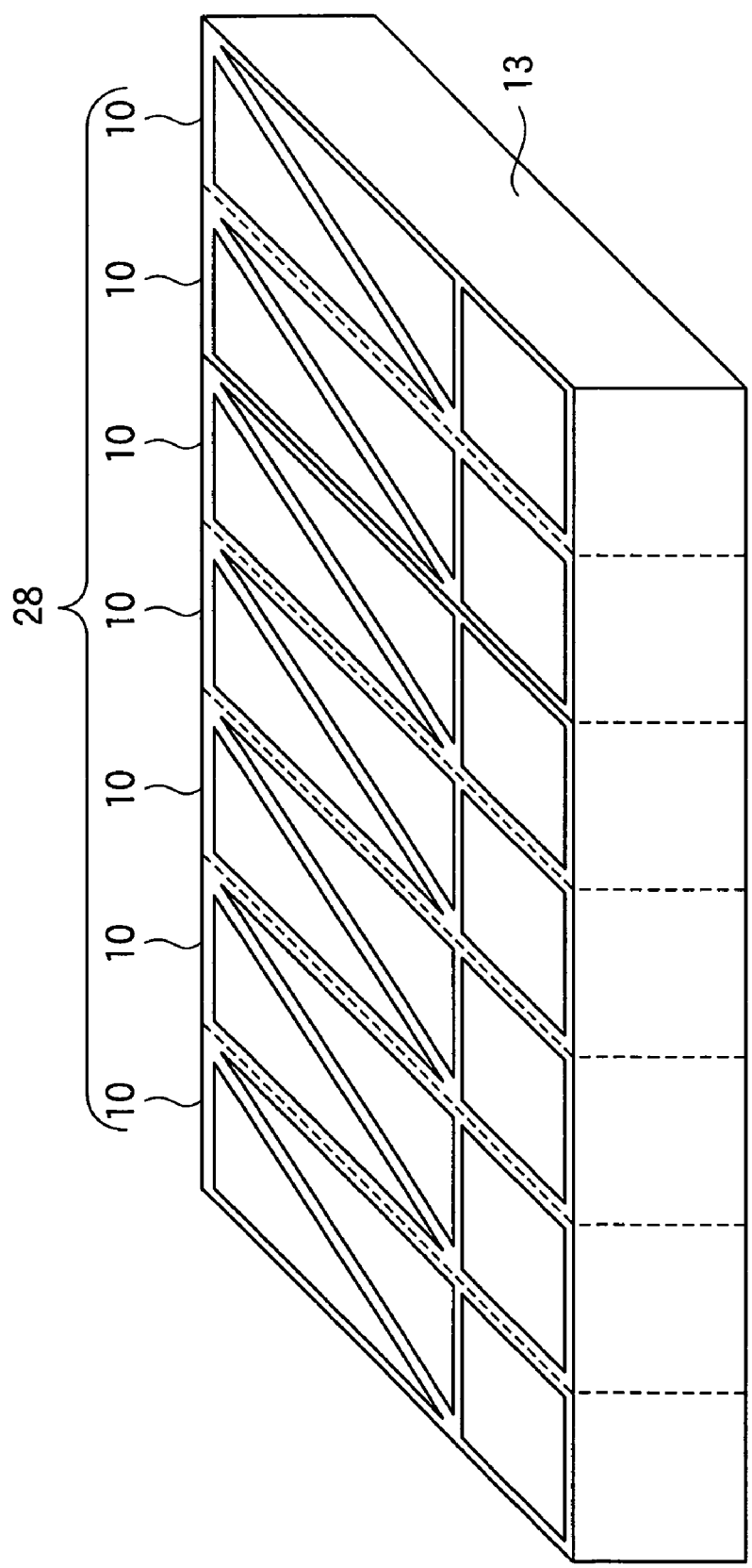
FIG. 15 is a perspective view schematically showing the structure of an optical deflector array based on the first embodiment.

Referring to FIG. 15, the deflector array 28 comprises a plurality of optical deflectors 10 of the type shown in FIG. 4 arranged in parallel in a large flat panel of electro-optic material 13 disposed on a substrate (not shown). This structure is possible because of the structure of the optical deflectors 10, having electrodes only on their upper and lower major surfaces. As there are no electrodes or other electrical components on the side surfaces of the optical deflectors 10, a plurality of optical deflectors 10 can be created in the same slab of electro-optic material 13. The deflector array 28 can be fabricated at a low cost as an integrated device by the same photolithographic processes as used in fabricating semiconductor integrated circuit devices.

Second Embodiment

An optical deflector according to a second embodiment will be described with reference to FIGS. 16 to 20.

Figure 16:
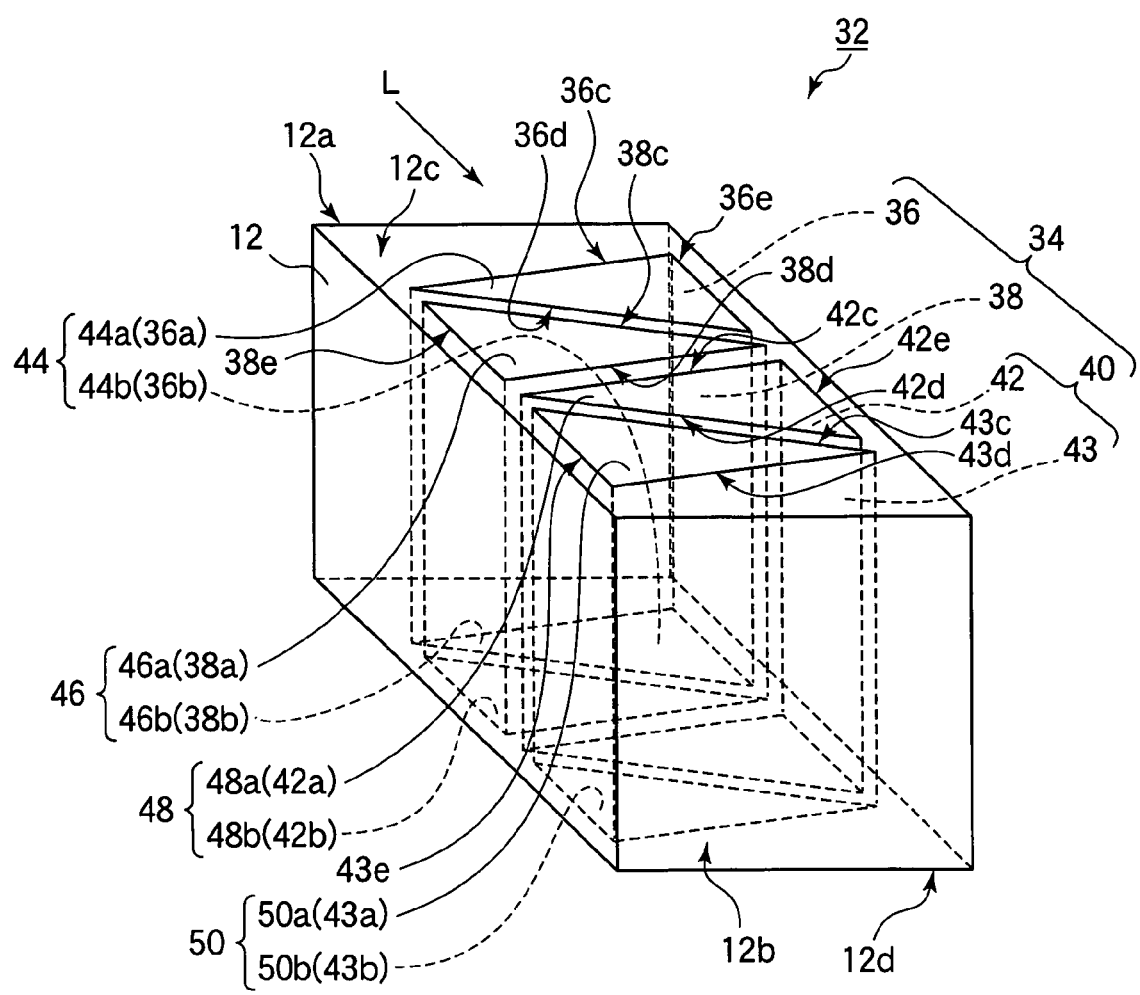
FIG. 16 is a perspective view showing the general structure of an optical deflector in a second embodiment.

FIG. 16 is a perspective view showing the general structure of the optical deflector. For simplicity, electrodes in FIG. 16 are depicted as having no thickness.

This optical deflector 32 is similar in structure to optical deflector 10 in the first embodiment except for the shape and arrangement of the regions formed in the electro-optic material 12. The following description will focus on the differences between the optical deflector 32 and the optical deflector 10.

The optical deflector 32 comprises a block of electro-optic material 12 having three interaction regions 34 disposed in series in the direction of propagation of the light beam L. From upstream to downstream, the three interaction regions 34 are a first region 36, a second region 38, and a third region 40.

The third region 40 is separated into two sub-regions: a first sub-region 42 and a second sub-region 43. In shape, the first sub-region 42 and the second sub-region 43 are mutually congruent, the first sub-region 42 is congruent to the first region 36, and the second sub-region 43 is congruent to the second region 38.

The first region 36 has a first front electrode 44a and first back electrode 44b, which form a first electrode pair 44. The first front electrode 44a is a flat isosceles triangle disposed on the upper major surface 12c of the electro-optic material 12 with its base parallel to the direction of propagation of the light beam L. The part of the upper major surface 12c below the first front electrode 44a forms the first facet or upper facet 36a of the first region 36.

The first back electrode 44b is congruent in shape to the first front electrode 44a, and is disposed on the lower major surface 12d in an area that forms an orthographic projection of the first front electrode 44a. The part of the lower major surface 12d above the first back electrode 44b forms the second facet or lower facet 36b of the first region 36.

The first region 36 is accordingly an isosceles triangular prismatic region in the electro-optic material 12 disposed between the first front electrode 44a and the first back electrode 44b, that is, between the upper facet 36a and the lower facet 36b.

The first region 36 has a first surface 36c or incident boundary interface through which light L enters the first region 36. The first surface 36c is disposed near the incident end facet 12a of the electro-optic material 12. Incident light L meets the first surface 36c at an oblique angle.

The first region 36 also has a second surface 36d or exit boundary interface through which light L leaves the first region 36. The second surface 36d is disposed near the other end facet 12b of the electro-optic material 12 and is not parallel to the first surface 36c. Light L exits through the second surface 36d at an oblique angle.

The first region 36 also has a side surface 36e that is parallel to a side facet of the electro-optic material 12.

The second region 38 has a second front electrode 46a and second back electrode 46b, which form a second electrode pair 46. The second front electrode 46a is a flat isosceles triangle congruent in shape to the first front electrode 44a, disposed on the upper major surface 12c. The base of the isosceles triangle is parallel to the direction of propagation of the light beam L. The part of the upper major surface 12c below the second front electrode 46a forms the third facet or the upper facet 38a of the second region 38.

The second back electrode 46b is congruent to the second front electrode 46a, and is disposed on the lower major surface 12d, in an area that forms an orthographic projection of the second front electrode 46a. The part of the lower major surface 12d above the second back electrode 46b forms the fourth facet or the lower facet 38b of the second region 38.

The second region 38 is accordingly an isosceles triangular prismatic region in the electro-optic material 12 disposed between the second front electrode 46a and the second back electrode 46b, that is, between the upper facet 38a and lower facet 38b.

The second region 38 has a third surface 38c or incident boundary interface through which light L enters the second region 38. The third surface 38c is disposed comparatively near the incident end facet 12a of the electro-optic material 12. Incident light L meets the third surface 38c at an oblique angle.

The second region 38 also has a fourth surface 38d or exit boundary interface through which light L leaves the second region 38. The fourth surface 38d is disposed comparatively near the other end facet 12b of the electro-optic material 12. The fourth surface 38d is not parallel to the third surface 38c, and is not parallel to the end facet 12b of the electro-optic material 12. Light L exits through the fourth surface 38d at an oblique angle.

The second region 38 also has a side surface 38e that is parallel to a side facet of the electro-optic material 12.

The first sub-region 42 of the third region 40 is three-dimensionally congruent in shape to the first region 36, but is located in a position translated parallel to the light propagation direction from the position of the first region 36.

The first sub-region 42 has a first front sub-electrode 48a and first back sub-electrode 48b, which form a third electrode pair 48.

The first front sub-electrode 48a is a flat isosceles triangle congruent in shape to the first front electrode 44a, disposed on the upper major surface 12c. The base of the isosceles triangle is parallel to the direction of propagation of the light beam L.

The part of the upper major surface 12c below the first front sub-electrode 48a forms the upper facet 42a of the first sub-region 42.

The first back sub-electrode 48b is congruent in shape to the first front sub-electrode 48a and is disposed on the lower major surface 12d, in an area that forms an orthographic projection of the first front sub-electrode 48a. The part of the lower major surface 12d above the first back sub-electrode 48b forms the lower facet 42b of the first sub-region 42.

The first sub-region 42 is an isosceles triangular prismatic region in the electro-optic material 12 disposed between the first front sub-electrode 48a and the first back sub-electrode 48b, that is, between its upper facet 42a and lower facet 42b.

The first sub-region 42 has a first sub-surface 42c or incident boundary interface through which light L enters the first sub-region 42. The first sub-surface 42c is disposed comparatively near the incident end facet 12a of the electro-optic material 12 and is oblique to the incident light beam L. The first sub-surface 42c is also the 'fifth surface' of the third region 40.

The first sub-region 42 also has a second sub-surface 42d or exit boundary interface through which light L leaves the first sub-region 42. The second sub-surface 42d is disposed comparatively near the other end facet 12b of the electro-optic material 12, and is not parallel to the first sub-surface 42c. Light L exits through the second sub-surface 42d at an oblique angle.

The first sub-region 42 also has a side surface 42e that is parallel to a side facet of the electro-optic material 12.

The second sub-region 43 is three-dimensionally congruent to the second region 38, but is located in a position translated parallel to the light propagation direction from the position of the second region 38.

The second sub-region 43 has a second front sub-electrode 50a and second back sub-electrode 50b, which form a third electrode pair 50.

The second front sub-electrode 50a is a flat isosceles triangle congruent in shape to the second front electrode 46a, disposed on the upper major surface 12c. The base of the isosceles triangle is parallel to the direction of propagation of the light beam L. The part of the upper major surface 12c below the second front sub-electrode 50a forms the upper facet 43a of the second sub-region 43.

The second back sub-electrode 50b is congruent to the second front sub-electrode 50a, and is disposed on the lower major surface 12d, in an area that forms an orthographic projection of the second front sub-electrode 50a. The part of the lower major surface 12d above the second back sub-electrode 50b forms the lower facet 43b of the second sub-region 43.

The second sub-region 43 is an isosceles triangular prismatic region in the electro-optic material 12 disposed between the second front sub-electrode 50a and the second back sub-electrode 50b, that is, between its upper facet 43a and lower facet 43b.

The second sub-region 43 has a third sub-surface 43c or incident boundary interface through which light L enters the second sub-region 43. The third sub-surface 43c is disposed near the incident end facet 12a of the electro-optic material 12. Incident light L meets the third sub-surface 43c at an oblique angle.

The second sub-region 43 also has a fourth sub-surface 43d or exit boundary interface through which light L leaves the second sub-region 43. The fourth sub-surface 43d is disposed near the other end facet 12b of the electro-optic material 12 and is not parallel to the third sub-surface 43c. Light L exits through the fourth sub-surface 43d at an oblique angle. The fourth sub-surface 43d is the 'sixth surface' of the third region 40.

The second sub-region 43 also has a side surface 43e that is parallel to one side facet of the block of electro-optic material 12.

Next the operation of the optical deflector 32 when a positive voltage is applied to the first front electrode 44a and first back sub-electrode 48b, and the first back electrode 44b and first front sub-electrode 48a are electrically grounded will be described. This operation is shown in plan view in FIG. 17 and in side view FIG. 18, which is a sectional view through line D in FIG. 17.

In the first region 36, the refractive index of the electro-optic material 12 increases linearly in the depth direction from the first front electrode 44a to the first back electrode 44b, as in the first embodiment. In the first sub-region 42, the refractive index of the electro-optic material 12 decreases linearly in the depth direction from the first front sub-electrode 48a to the first back sub-electrode 48b. In both the first region 36 and the first sub-region 42 the refractive index is lower in than in the surrounding parts of the electro-optic material 12.

Figure 17:
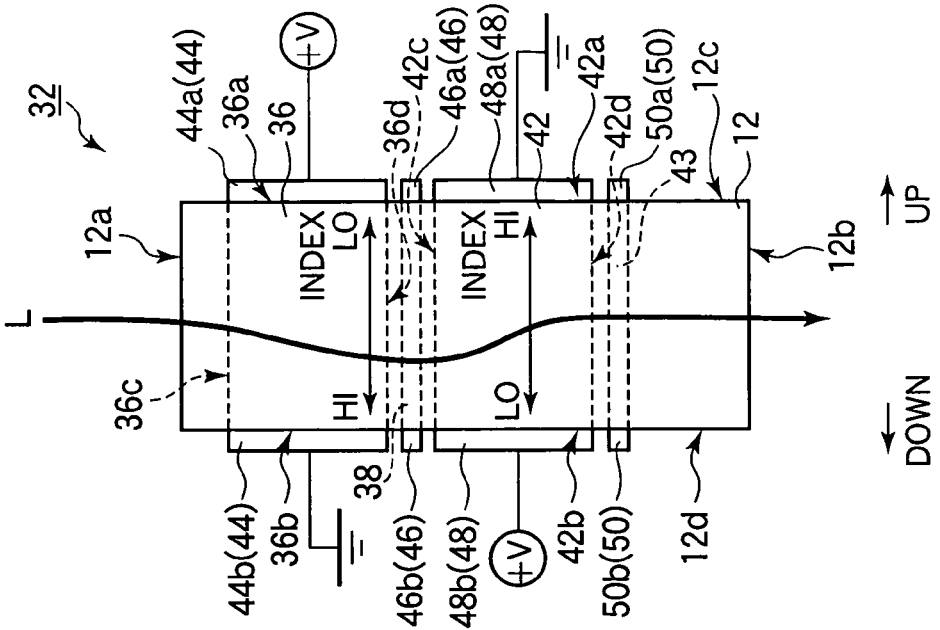
FIG. 17 is a plan view of the optical deflector, showing an optical transmission path in the second embodiment.

Because the first region 36 has a lower refractive index than the surrounding parts of the electro-optic material 12, light L is refracted horizontally, toward the left in FIG. 17, both when it enters the first region 36 at the first surface 36c and when it exits the first region 36 at the second surface 36d.

After exiting the first region 36, the light beam L passes through the second region 38 without deflection and enters the first sub-region 42. Because the first sub-region 42 has a lower refractive index than the surrounding part of the electro-optic material 12, the light beam L is again refracted horizontally toward the left in FIG. 17 when it enters the first sub-region 42 at the first sub-surface 42c and when it exits the first sub-region 42 at the second sub-surface 42d.

As a result, both the first region 36 and the first sub-region 42 deflect the light beam L horizontally toward the left.

Figure 18:
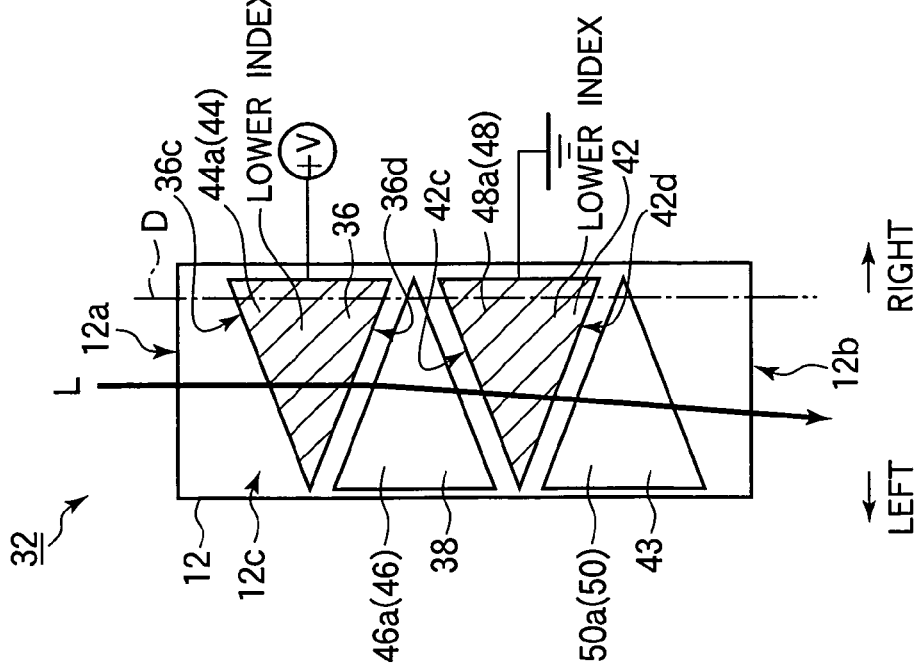
FIG. 18 is a sectional view of the optical deflector along line D in FIG. 17.

In the depth direction, as shown in FIG. 18, the light beam L is refracted downward in the first region 36, passes through the second region 38 without deflection, and is refracted upward in the first sub-region 42. In both cases the deflection is in the direction of increasing refractive index. The light beam L exits the optical deflector 32 with no net deflection in the depth direction, having been deflected by equal amounts in opposite directions in the first region 36 and the first sub-region 42.

Next, the operation when same voltage is applied across the first region 36 and second region 38 with no voltage applied across the first and second sub-regions 42, 43 will be described. This operation is shown in plan view in FIG. 19 and in side view FIG. 20, which is a sectional view through line D in FIG. 19.

Figure 19:
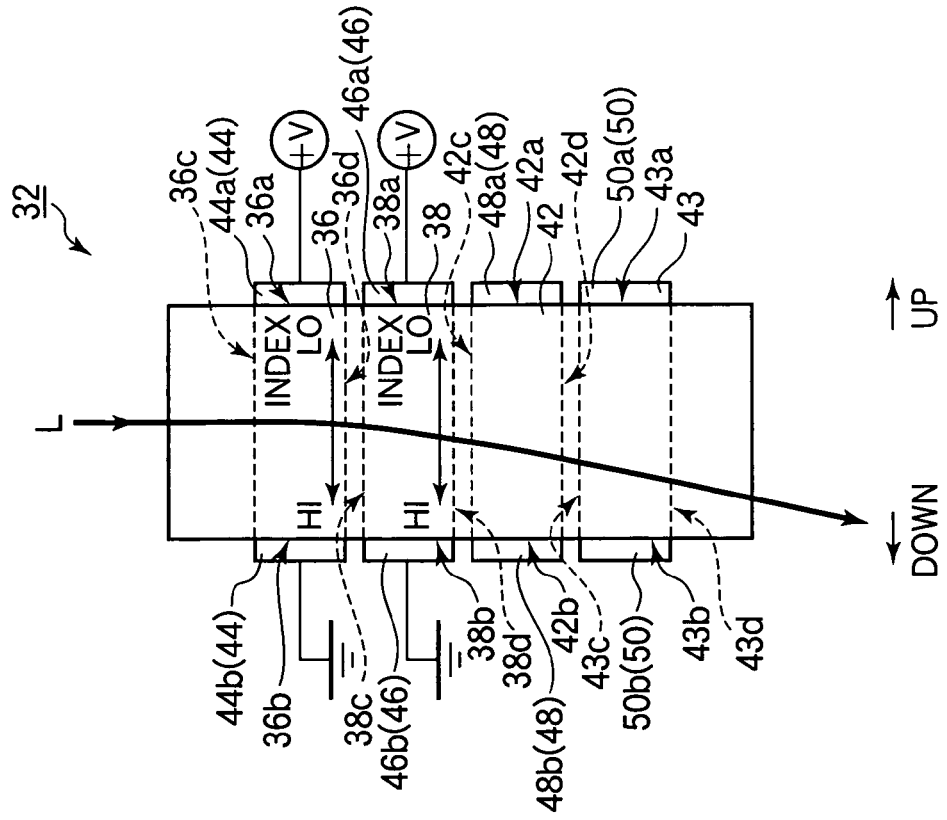
FIG. 19 is a plan view of the optical deflector, showing another optical transmission path in the second embodiment.
Figure 20:
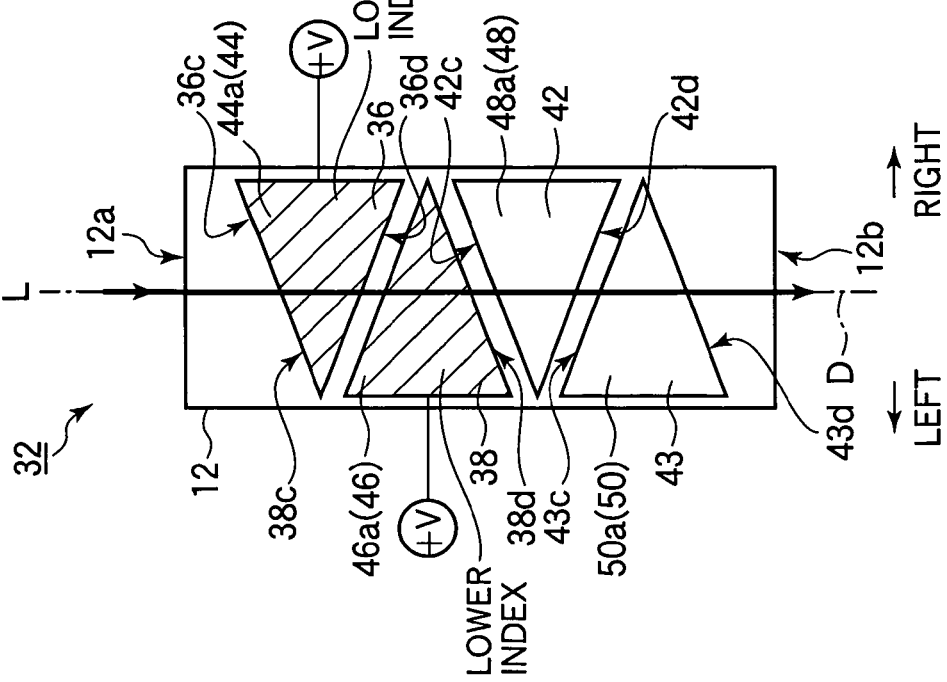
FIG. 20 is a sectional view of the optical deflector along line D in FIG. 19.

As shown in FIGS. 19 and 20, a positive voltage is applied to the first and second front electrodes 44a, 46a, the first and second back electrodes 44b, 46b are electrically grounded, and no voltage is applied across the first sub-region 42 and second sub-region 43. This time, the light beam L is deflected downward by a large amount, but there is no net horizontal deflection.

In the opposite case (not illustrated) in which the first and second front electrodes 44a, 46a are electrically grounded, a positive voltage is applied to the first and second back electrodes 44b, 46b, and no voltage is applied across the first and second sub-regions 42, 43, the light beam L is deflected upward by a large amount with no net horizontal deflection.

Next, the operation when same voltage is applied across the second region 38 and second sub-region 43 and no voltage is applied across the first region 36 and first sub-region 42 will be described. This operation is shown in plan view in FIG. 21 and in side view FIG. 22, which is a sectional view through line D in FIG. 21.

As shown in FIGS. 21 and 22, the second front electrode 46a and second front sub-electrode 50a are electrically grounded, a positive voltage is applied to the second back electrode 46b and second back sub-electrode 50b, and no voltage is applied across the first region 36 and first sub-region 42. The light beam L is deflected horizontally toward the right and upward in the depth direction.

In the opposite case (not illustrated) in which a positive voltage is applied to the second front electrode 46a and second front sub-electrode 50a, the second back electrode 46b and second back sub-electrode 50b are grounded, and no voltage is applied across the first region 36 and first sub-region 42, the light beam L is deflected horizontally toward the left and downward in the depth direction.

The optical deflector 32 in the second embodiment produces substantially the same effects as the optical deflector 10 in the first embodiment.

As in the first embodiment, the electrodes are preferably separated from each other by a distance greater than the thickness of the electro-optic material 12, or by grooves between the electrodes if this separation distance is not feasible.

The number of the electrode pairs is a design choice and is not limited to the four electrode pairs 44, 46, 48, 50 shown in the drawings. The optical deflector 32 may have any suitable number of electrode pairs. For example, one set of electrode pairs 44, 46, 48, and 50 may followed by one or more further similar sets of electrode pairs arranged in the direction of propagation of the light beam L in the electro-optic material 12.

An array of optical deflectors 32 may be fabricated, similar to the optical deflector array 28 in FIG. 15.

Third Embodiment

An optical deflector according to a third embodiment will be described with reference to FIGS. 23 to 31.

The third embodiment differs from the first and second embodiments in that the optical deflector employs the Pockels effect instead of the Kerr effect.

The Pockels effect is an effect in which the refractive index of a medium changes in direct proportion to the magnitude of the voltage applied across the medium.

Figure 23:
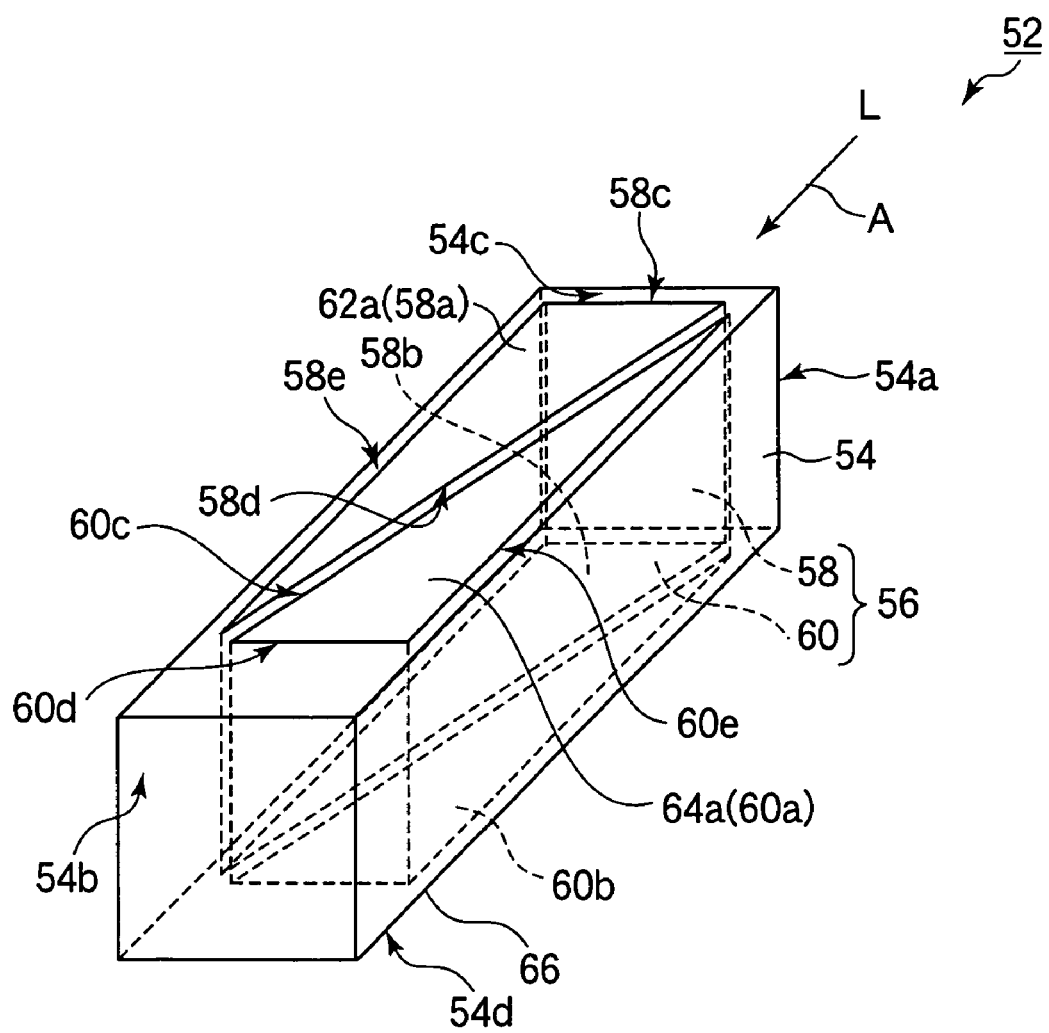
FIG. 23 is a perspective view of the general structure of the optical deflector in a third embodiment of the invention.

FIG. 23 is a perspective view showing the general structure of the optical deflector 52. For simplicity, electrodes in FIG. 23 are depicted as having no thickness.

As shown in FIG. 23, the optical deflector 52 comprises a block of an electro-optic material 54 and two or more mutually separated interaction regions 56 in the electro-optic material 54.

The structure of the optical deflector 52 is similar to the structure of the optical deflector 10 in the first embodiment except for the following points.

(1) The optical deflector 52 uses an electro-optic material 54 with an electro-optic coefficient that varies linearly in the depth direction.

(2) The two front electrodes 62a, 64a face a single shared back electrode 66.

(3) The optical deflector 52 lacks the third region 20 that was present in the first embodiment.

(4) The first front electrode 62a, the second front electrode 64a and the back electrode 66 are non-ohmic electrodes, or they are reverse biased so as to oppose carrier injection.

The following description deals mainly with these differences.

The electro-optic material 54 is a flat rectangular solid having end facets 54a and 54b with a flat square shape. Light propagating in the direction of arrow A enters the electro-optic material 54 at end facet 54a and exits at end facet 54b.

The electro-optic material 54 has a first or upper major surface 54c on which the first and second front electrodes 62a, 64a are formed and a second or lower major surface 54d on which the back electrode 66 is formed as described below. The direction from the upper major surface 54c to the lower major surface 54d will be referred to as the depth direction; directions parallel to the upper major surface 54c, perpendicular to the depth direction, will be referred to as horizontal directions.

The electro-optic material 54 differs from the electro-optic material 12 in the first and second embodiments in that it is formed of a material with an electro-optic coefficient that is linearly graded in the depth direction.

More specifically, the electro-optic material 54 has a composition that varies in the depth direction, causing its electro-optic coefficient to increase linearly in the depth direction. An exemplary preferred material for the electro-optic material 12 is potassium tantalum niobate ($KTa_{1-x}Nb_xO_3$, where $0 \leq x \leq 1$).

The Pockels effect enables the refractive index of the electro-optic material 54 to be controlled by an applied positive or negative voltage. When a positive voltage is applied, the refractive index of the electro-optic material increases linearly in the depth direction; when a negative voltage is applied, the refractive index decreases linearly in the depth direction.

The electro-optic material 54 is not limited to the $KTa_{1-x}Nb_xO_3$ material mentioned above. Another material that can be provided with an electro-optic coefficient that varies linearly in the depth direction is the compound semiconductor material indium gallium arsenide phosphide (InGaAsP). The electro-optic material lithium niobate ($LiNbO_3$) can also be used; in this case it is the ratio of domains with a first polarization or crystal geometry to domains with a second polarization or crystal geometry that varies in the depth direction.

Two interaction regions 56, a first region 58 and a second region 60, are disposed in the electro-optic material 54. In relation to the propagation of light L, the first region 58 is upstream and the second region 60 is downstream.

The first region 58 is defined by the first front electrode 62a, which is a flat right triangle disposed on the upper major surface 54c. The part of the upper major surface 54c below the first front electrode 62a forms the first facet or upper facet 58a of the first region 58, while the orthographic projection of the first front electrode 62a onto the lower major surface 54d forms the second facet or lower facet 58b of the first region 58. The first region 58 is a right triangular prismatic region in the electro-optic material 54 disposed between the upper facet 58a and lower facet 58b.

The first region 58 has a first surface 58c or incident boundary interface through which light L enters the first region 58. The first surface 58c is disposed near the incident end facet 54a of the electro-optic material 54 and is normal to the incident light L.

The first region 58 also has a second surface 58d or exit boundary interface through which light L leaves the first region 58. The second surface 58d is disposed closer to the other end facet 54b of the electro-optic material 54 and follows the hypotenuse of the right triangular first front electrode 62a. The second surface 58d is not normal to the exiting light L.

The first region 58 also has a side surface 58e that extends parallel to a side facet of the electro-optic material 54.

The second region 60 is defined by the second front electrode 64a, which is a flat right triangle that is congruent to the first front electrode 62a, and is disposed on the upper major surface 54c. The part of the upper major surface 54c below the second front electrode 64a forms the third facet or the upper facet 60a of the second region 60, while the orthographic projection of the second front electrode 64a onto the lower major surface 54d forms the fourth facet or the lower facet 60b of the second region 60.

The second region 60 is a right triangular prismatic region in the electro-optic material 54 disposed between the upper facet 60a and the lower facet 60b.

The second region 60 has a third surface 60c or incident boundary interface through which light L enters the second region 60. The third surface 60c is the nearest side of the second region 60 to the incident end facet 54a of the electro-optic material 54 and follows the hypotenuse of the second front electrode 64a, which is not parallel to the end facets 54a, 54b of the electro-optic material 54. Light L enters the second region 60 through the third surface 60c at an oblique angle.

The second region 60 also has a fourth surface 60d or exit boundary interface through which light L leaves the second region 60. In this exemplary structure, the fourth surface 60d is disposed near end facet 54b of the electro-optic material 54. If not deflected, light L exits the second region 60 normal to the fourth surface 60d.

The second region 60 also has a side surface 60e that extends parallel to a side facet of the electro-optic material 54.

The first surface 58c of the first region 58 and the fourth surface 60d of the second region 60 are parallel. The second surface 58d of the first region 58 and the third surface 60c of the second region 60 are parallel and face each other. Taken together, accordingly, the second region 60 and first region 58 essentially form two halves of a rectangular parallelepiped.

The back electrode 66 covers the entire lower major surface 54d of the electro-optic material 54, facing both the first and second front electrodes 62a, 64a.

In order to facilitate the Pockels effect, the front and back electrodes 62a, 64a, 66 are formed so as to make non-ohmic contact with the electro-optic material 54. The front and back electrodes 62a, 64a, 66 are preferably formed by depositing films of a metal such as platinum (Pt) or gold (Au). The front electrodes 62a, 64a may be patterned by photolithography.

Next the operation of the optical deflector 52 will be described with reference to FIGS. 24 to 31. In all of the operations described, the back electrode 66 is electrically grounded.

First, the operation when a voltage is applied to the first front electrode 62a will be described. This operation is shown in plan view in FIG. 24 and in side view FIG. 25, looking from the direction of arrow B in FIG. 24.

When a positive voltage is applied to the first front electrode 62a, the electro-optic coefficient of the electro-optic material 54 increases linearly in the depth direction, from the first front electrode 62a to the back electrode 66. Due to the Pockels effect caused by the applied voltage, the refractive index of the first region 58 increases linearly in the depth direction.

As a result, the refractive index is higher in the first region 58 than in the surrounding parts of the electro-optic material 54. As shown in FIG. 24, light L is refracted or deflected towards the left at the second surface 58d. In this case, light L is deflected horizontally at the second surface 58d (exit interface) but not at the first surface 58c (incident interface).

As shown in FIG. 25, as the refractive index of the first region 58 increases linearly in the depth direction, light L is refracted or deflected downward while passing through the first region 58.

Next, the operation when a negative voltage (−V) is applied to the first front electrode 62a will be described. This operation is shown in plan view in FIG. 26 and in side view FIG. 27, looking from the direction of arrow B in FIG. 26.

Due to the Pockels effect, the refractive index in the first region 58 now decreases linearly in the depth direction from the first front electrode 62a to the back electrode 66. The refractive index is accordingly lower in the first region 58 than in the surrounding parts of the electro-optic material 54. As shown in FIG. 26, light L is refracted or deflected horizontally towards the right at the second surface 58d. As before, light L is deflected horizontally at the second surface 58d (exit interface) but not at the first surface 58c (incident interface).

As shown in FIG. 27, as the refractive index of the first region 58 decreases linearly in the depth direction, light L is refracted or deflected upward in the depth direction while passing through the first region 58.

Next, an operation using both the first and second front electrodes 62a, 64a will be described. This operation is shown in plan view in FIG. 28 and in side view FIG. 29, which is a sectional view along line D in FIG. 28.

The operation when positive voltages with the same magnitude are applied to the first and second front electrodes 62a, 64a will be described. In this case, the first and second front electrodes 62a, 64a operate as if they were a single rectangular electrode.

Figure 28:
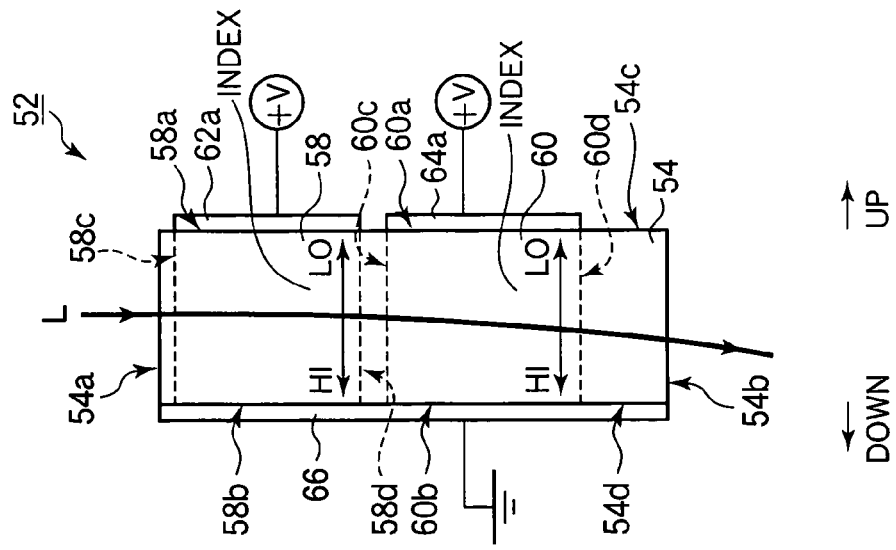
FIG. 28 is a plan view of the optical deflector, showing another optical transmission path in the third embodiment.
Figure 29:
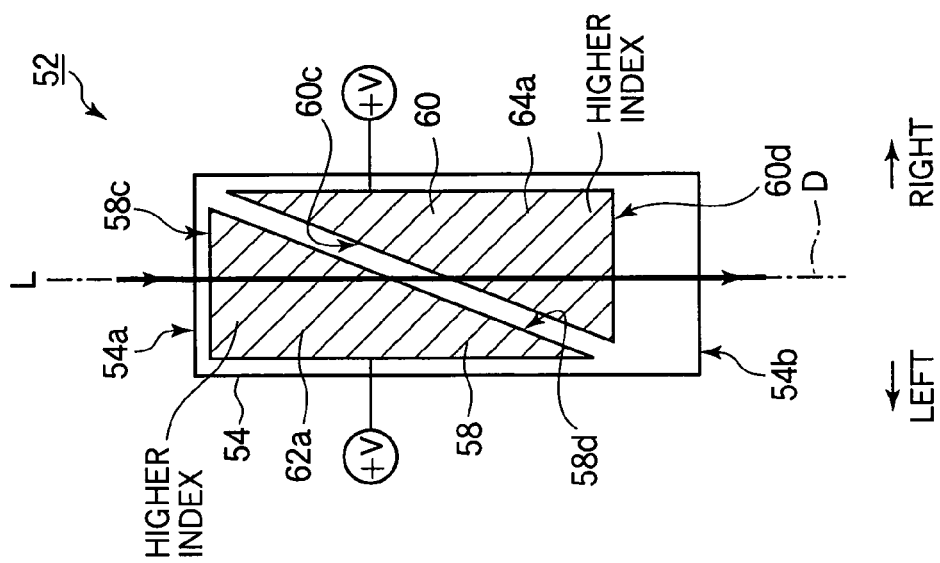
FIG. 29 is a sectional view of the optical deflector along line D in FIG. 28.

Therefore, as shown in FIG. 28, light L passes through without horizontal deflection. As shown in FIG. 29, the first region 58 and the second region 60 have the same refractive index gradation in the depth direction, increasing from the upper major surface 54c to the lower major surface 54d. The light beam L is therefore deflected downward in both the first region 58 and the second region 60. The total angle of downward deflection is larger than in FIG. 25.

Although not illustrated, a similar effect is obtained when negative voltages with the same magnitude are applied to the first and second front electrodes 62a, 64a. Light L is deflected upward by a large amount without horizontal deflection.

Next, the operation when a positive voltage is applied to the first front electrode 62a and a negative voltage with same magnitude is applied to the second front electrode 64a will be described. This operation is shown in plan view in FIG. 30 and in side view FIG. 31, which is a sectional view along line D in FIG. 30.

Figure 31:
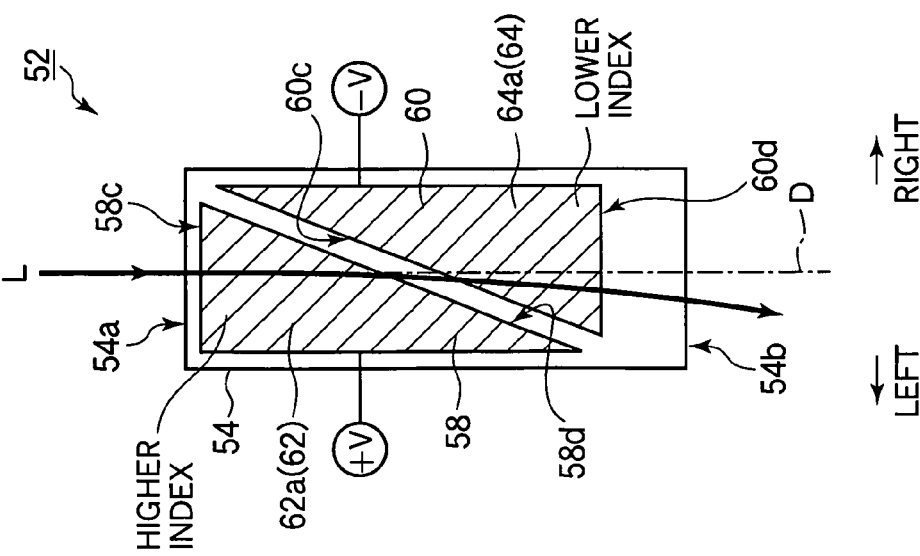
FIG. 31 is a sectional view of the optical deflector along line D in FIG. 30.

In the depth direction, the first region 58 and second region 60 have opposite refractive index distributions, producing opposite deflections that cancel out as shown in FIG. 31. As a result, light L passes through the optical deflector 52 with no net deflection in the depth direction.

Figure 30:
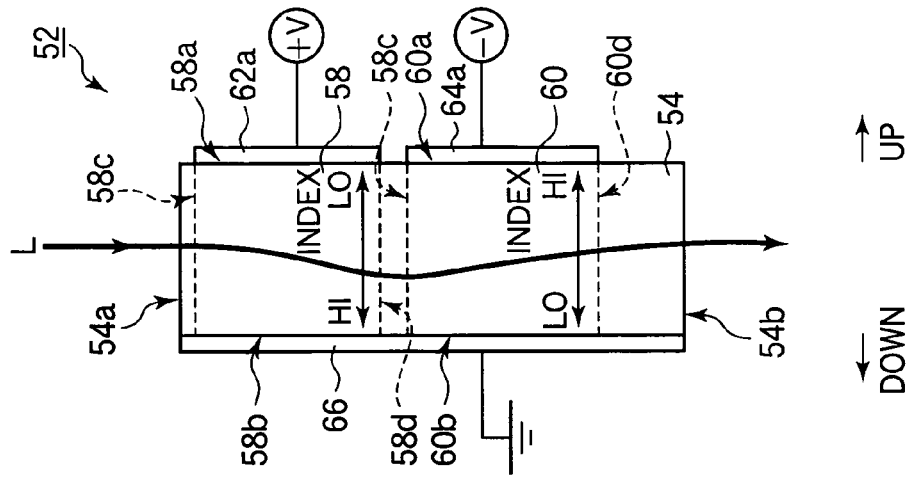
FIG. 30 is a plan view of the optical deflector, showing another optical transmission path in the third embodiment.

As shown in FIG. 30, however, the refractive index is higher in the first region 58 than in the surrounding parts of the electro-optic material 54, so light L is deflected toward the left at the second surface 58d. The refractive index is lower in the second region 60 than in the surrounding parts of the electro-optic material 54, so the light beam L is further deflected toward the left at the third surface 60c and fourth surface 60d.

As a result, the light beam L is deflected by a large amount towards the left without deflection in the depth direction.

Although not illustrated, a similar effect is obtained when a negative voltage is applied to the first front electrode 62a and a positive voltage with same magnitude is applied to the second front electrode 64a. Light L is deflected by a large amount horizontally toward the right without deflection in the depth direction.

The optical deflector 52 in this embodiment provides substantially the same effects as the optical deflector 10 in the first embodiment, but by using the Pockels effect, the optical deflector 52 can deflect light L over the same range of angles with fewer electrodes than the optical deflectors 10 and 32 in the preceding embodiments, which used the Kerr effect.

As in the first embodiment, the electrodes are preferably separated from each other by a distance greater than the thickness of the electro-optic material 54, or by grooves if this separation distance is not feasible.

The number of front electrodes is a design choice and is not limited to the two front electrodes shown in the drawings. The optical deflector 52 may have any suitable number of electrodes. For example, one pair of front electrodes 62a, 64a may be followed by one or more similar pairs of front electrodes arranged in the direction of propagation of light L in the electro-optic material 54. Alternatively, isosceles triangular electrodes may be alternately disposed in series as in the second embodiment.

An array of optical deflectors 52 may be fabricated, similar to the deflector array 28 in FIG. 15.

In a variation of the third embodiment, the shared back electrode 66 is replaced by separate back electrodes facing the first front electrode 62a and second front electrode 64a. The same effects are obtained.

Fourth Embodiment

An optical deflector according to a fourth embodiment will be described with reference to FIGS. 32 to 40.

Figure 32:
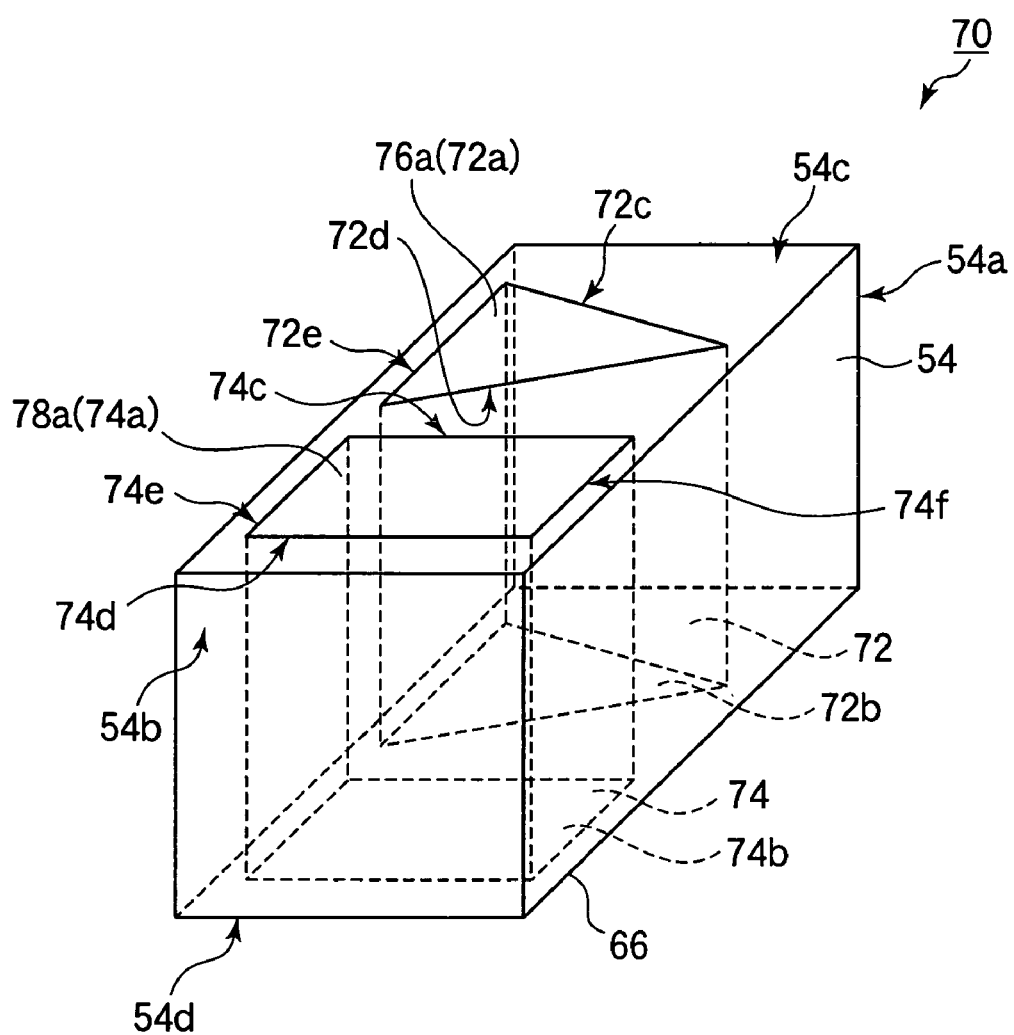
FIG. 32 is a perspective view showing the general structure of the optical deflector in a fourth embodiment of the invention.

FIG. 32 is a perspective view showing the general structure of the optical deflector. For simplicity, electrodes in FIG. 32 are depicted as having no thickness.

The optical deflector 70 in the fourth embodiment is similar to the optical deflector 52 in the third embodiment except for the shape of the first region 72 and second region 74 in the electro-optic material 54. The following description deals mainly with this difference.

As seen in FIG. 32, the first region 72 and the second region 74 in the optical deflector 70 are disposed in the electro-optic material 54 in series in the direction of propagation of light L, the first region 72 being upstream of the second region 74.

The first region 72 has a first front electrode 76a with a flat isosceles triangular shape disposed in the upper major surface 54c, the base of the isosceles triangle being parallel to the direction of propagation of the light beam L.

The part of the upper major surface 54c below the first front electrode 76a forms the first facet or upper facet 72a of the first region 72, while the area defined by orthographic projection of the first front electrode 76a onto the lower major surface 54d forms the second facet or lower facet 72b of the first region 72. The first region 72 is a right triangular prismatic region in the electro-optic material 54 disposed between the upper facet 72a and the lower facet 72b.

The first region 72 has a first surface 72c or incident boundary interface through which light L enters the first region 72. The first surface 72c is disposed near the incident end facet 54a of the electro-optic material 54 and is not parallel to this end facet 54a. The incident light L is not normal to the first surface 72c.

The first region 72 has a second surface 72d or exit boundary interface through which light L leaves the first region 72. In this exemplary structure, the second surface 72d is disposed comparatively near the other end facet 54b of the electro-optic material 54 but is not parallel to this end facet 54b, and is not parallel to the first surface 72c of the first region 72. Light L exits from the second surface 72d at an oblique angle.

The first region 72 also has a side surface 72e that is parallel to a side facet of the electro-optic material 54.

The second region 74 has a flat rectangular second front electrode 78a disposed on the upper major surface 54c, with two opposite sides normal to the direction of propagation of the light beam L.

The part of the upper major surface 54c below the second front electrode 78a forms the third facet or the upper facet 74a of the second region 74 while the area defined by orthographic projection of the second front electrode 78a onto the lower major surface 54d forms the fourth facet or the lower facet 74b of the second region 74. The second region 74 is a rectangular prismatic region in the electro-optic material 54 disposed between the upper facet 74a and lower facet 74b.

The second region 74 has a third surface 74c or incident boundary interface through which light L enters the second region 74. The third surface 74c is the nearest side of the second region 74 to the incident end facet 54a of the electro-optic material 54, and is parallel to this end facet 54a. If not diffracted in the first region 72, incident light L meets the third surface 74c of the second region 74 at a normal angle.

The second region 74 has a fourth surface 74d or exit boundary interface through which light L leaves the second region 74. In this exemplary structure, the fourth surface 74d is disposed near the other end facet 54b of the electro-optic material 54, and is parallel to this end facet 54b and to the third surface 74c of the second region 74. If not deflected, light L exits through the fourth surface 74d at a normal angle.

The second region 74 also has side surfaces 74e, 74f that extend parallel to side facets of the electro-optic material 54.

Next the operation of the optical deflector 70 will be described with reference to FIGS. 33 to 40. In the operations described below, the back electrode 66 is electrically grounded.

First the operation when a positive voltage is applied to the first front electrode 76a will be described. This operation is shown in plan view in FIG. 33 and in side view FIG. 34, looking from the direction of arrow B in FIG. 33.

Since the electro-optic coefficient of the electro-optic material 54 increases linearly in the depth direction, due to the Pockels effect, the refractive index of the first region 72 increases linearly in the depth direction from the first front electrode 76a to the back electrode 66, and is higher than in the surrounding parts of the electro-optic material 54.

Figure 33:
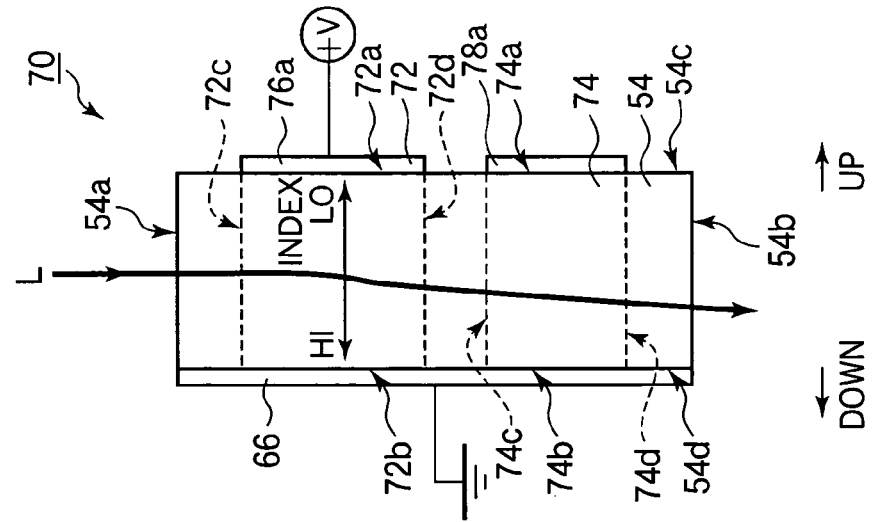
FIG. 33 is a plan view of the optical deflector, showing an optical transmission path in the fourth embodiment.

Since the refractive index is higher in the first region 72 than in the surrounding parts of the electro-optic material 54, as shown in FIG. 33, light L is refracted or deflected towards the left at the first surface 72c and the second surface 72d. The light beam L is thus deflected horizontally at both the first surface 72c (incident interface) and the second surface 72d (exit interface).

Figure 34:
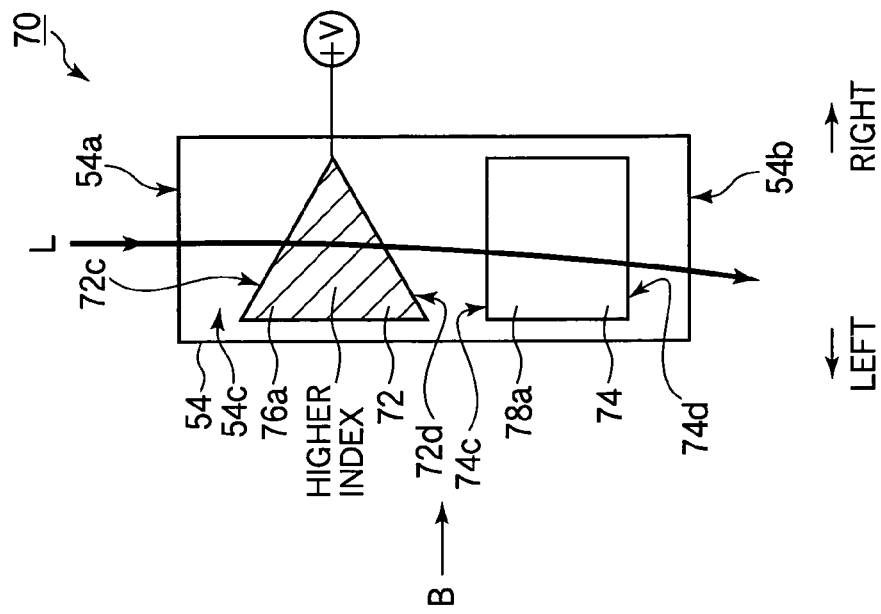
FIG. 34 is a side view of the optical deflector viewed from the direction of arrow B in FIG. 33.

Since the refractive index of the first region 72 increases linearly in the depth direction, as shown in FIG. 34, the light beam L is refracted or deflected downward while passing through the first region 72.

Next, the operation when a negative voltage is applied to the first front electrode 76a will be described. This operation is shown in plan view in FIG. 35 and in side view FIG. 36, looking from the direction of arrow B in FIG. 35. Due to the Pockels effect, the refractive index in the first region 72 decreases linearly in the depth direction.

Figure 35:
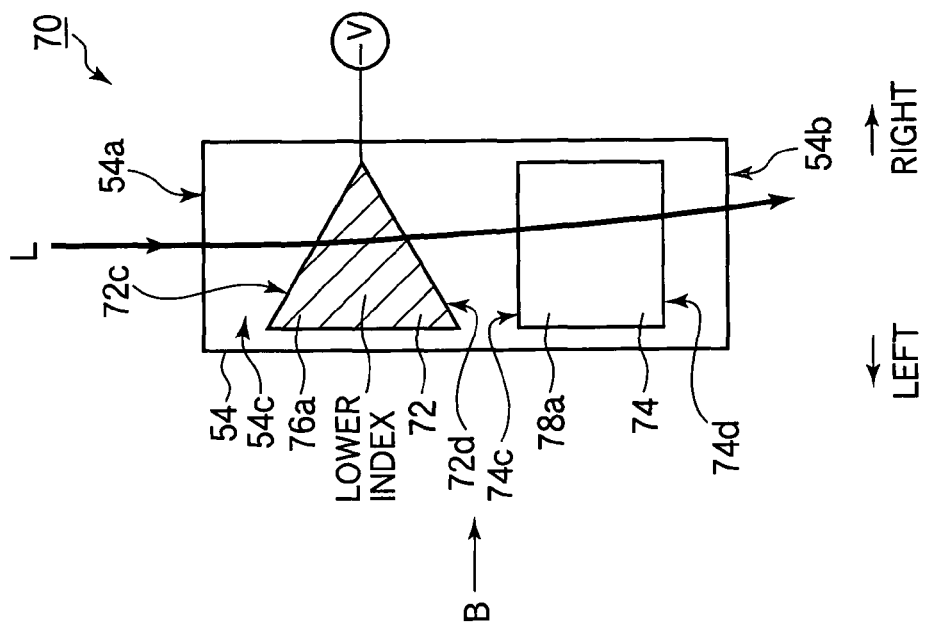
FIG. 35 is a plan view of the optical deflector, showing another optical transmission path in the fourth embodiment.

The refractive index is now lower in the first region 72 than in the surrounding parts of the electro-optic material 54. As shown in FIG. 35, light L is refracted or deflected towards the right at the first and second surfaces 72c, 72d. In this case also, the light beam L is deflected horizontally at both the first surface 72c (incident interface) and the second surface 72d (exit interface).

Figure 36:
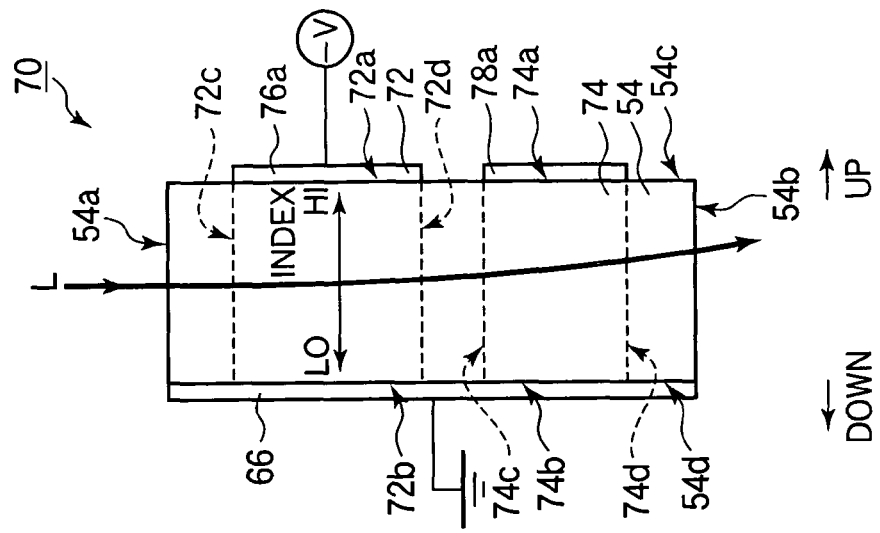
FIG. 36 is a side view of the optical deflector viewed from the direction of arrow B in FIG. 35.

As shown in FIG. 36, since the refractive index of the first region 72 decreases linearly in the depth direction, the light beam L is refracted or deflected upward while passing through the first region 72.

Next, operations when various voltages are applied to both the first front electrode 76a and the second front electrode 78a will be described.

First, the operation when the same voltage is applied to the first and second front electrodes 76a, 78a will be described. This operation is shown in plan view in FIG. 37 and in side view FIG. 38, looking from the direction of arrow B in FIG. 37. In these figures, a positive voltage is applied to the first and second front electrodes 76a, 78a.

Figure 37:
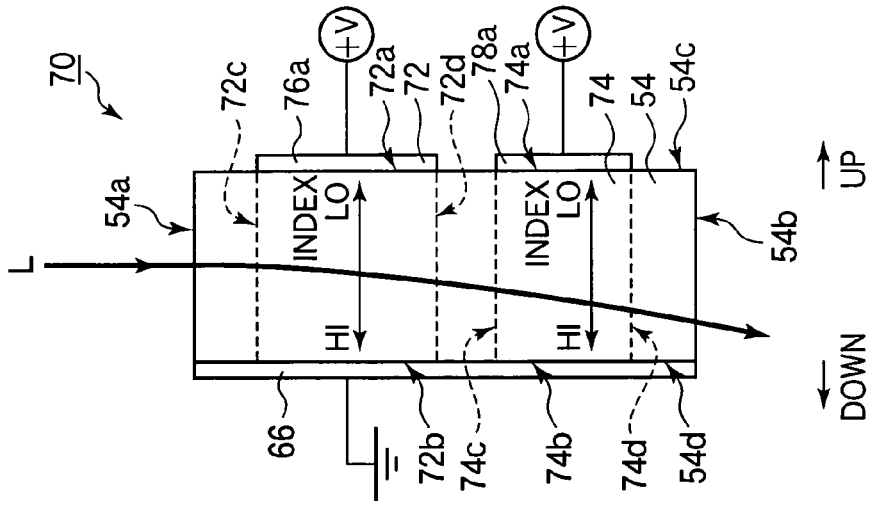
FIG. 37 is a plan view of the optical deflector, showing another optical transmission path in the fourth embodiment.

In the horizontal direction, as shown in FIG. 37, light L is refracted towards the left in the first region 72 and then exits toward the second region 74. Because the third surface 74c and fourth surface 74d of the second region 74 are mutually parallel, despite the altered refractive index of the second region 74, the light beam L is not deflected horizontally by its passage through the second region 74.

Figure 38:
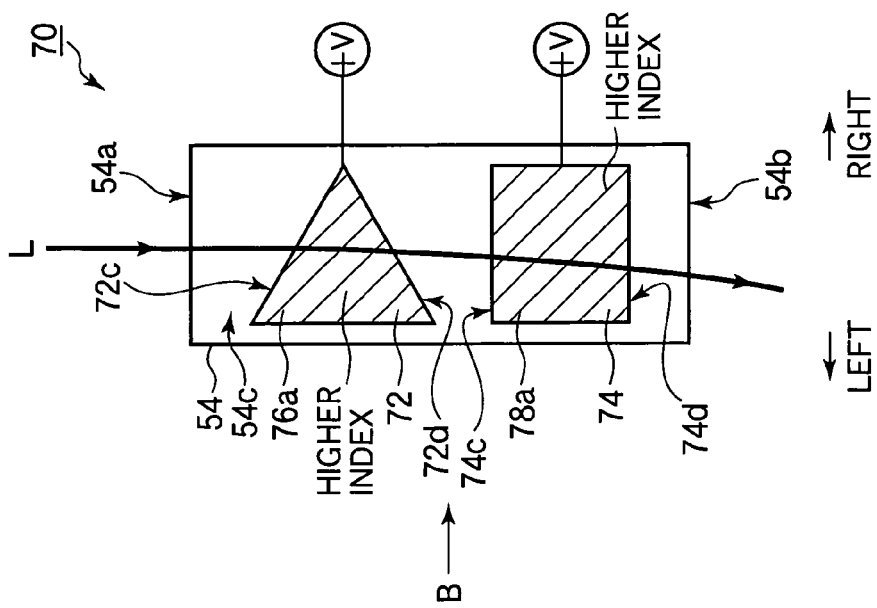
FIG. 38 is a side view of the optical deflector viewed from the direction of arrow B in FIG. 37.

Referring to FIG. 38, because the first region 72 and the second region 74 have same refractive index distribution in the depth direction, the refractive index increasing linearly with depth, light L is deflected downwards in the depth direction as it passes through both regions 72, 74.

The horizontal deflection is accordingly the same as when the positive voltage is applied only to the first front electrode 76a, but that the deflection in the depth direction is greater.

Next, the operation when voltages with opposite signs are applied to the first front electrode 76a and second front electrode 78a will be described. This operation is shown in plan view in FIG. 39 and in side view FIG. 40, looking from the direction of arrow B in FIG. 39. In these figures, a positive voltage is applied to the first front electrode 76a while a negative voltage is applied to the second front electrode 78a.

As shown in FIG. 39, light L is deflected horizontally towards the left and exits toward the second region 74. Because the third surface 74c and the fourth surface 74d of the second region 74 are parallel, the light beam L is not deflected horizontally in the second region 74, despite its altered refractive index.

The second region 74 now has a refractive index distribution opposite to that of the first region 72 in the depth direction. The refractive index increases linearly with depth in the first region 72 and decreases linearly with depth in the second region 74. As shown in FIG. 40, light L is deflected downward in the first region 72 and upward in the second region 74. The upward and downward deflections cancel out, so the light beam L exits the optical deflector 70 with no net deflection in the depth direction.

Overall, compared to the case where voltage is applied only to the first front electrode 76a, the deflection of light is the same in the horizontal direction but there is no deflection in the depth direction.

The optical deflector 70 in the fourth embodiment provides substantially the same effects as the optical deflector 10 in the second embodiment. By using the Pockels effect instead of the Kerr effect, however, the optical deflector 70 in the fourth embodiment can deflect light L over the same range of angles with fewer electrodes than the optical deflector 32 in the second embodiment.

As in the first embodiment, the electrodes are preferably separated from each other by a distance greater than the thickness of the electro-optic material 54, or by grooves between the electrodes if this separation distance is not feasible.

The number of front electrodes is a design choice and is not limited to the two front electrodes 76a and 78a shown in the drawings. The optical deflector 70 may have any suitable number of front electrodes.

An array of optical deflectors 70 may be fabricated, similar to the deflector array 28 in FIG. 15.

The first front electrode 76a and the second front electrode 78a may be paired with separate back electrodes, as in the first and the second embodiments, instead of having a shared back electrode 66. In FIG. 32, reference numerals 72b and 74b may be considered to indicate such separate back electrodes.

Fifth Embodiment

An optical deflector according to a fifth embodiment will be described with reference to FIGS. 41 to 45.

Figure 41:
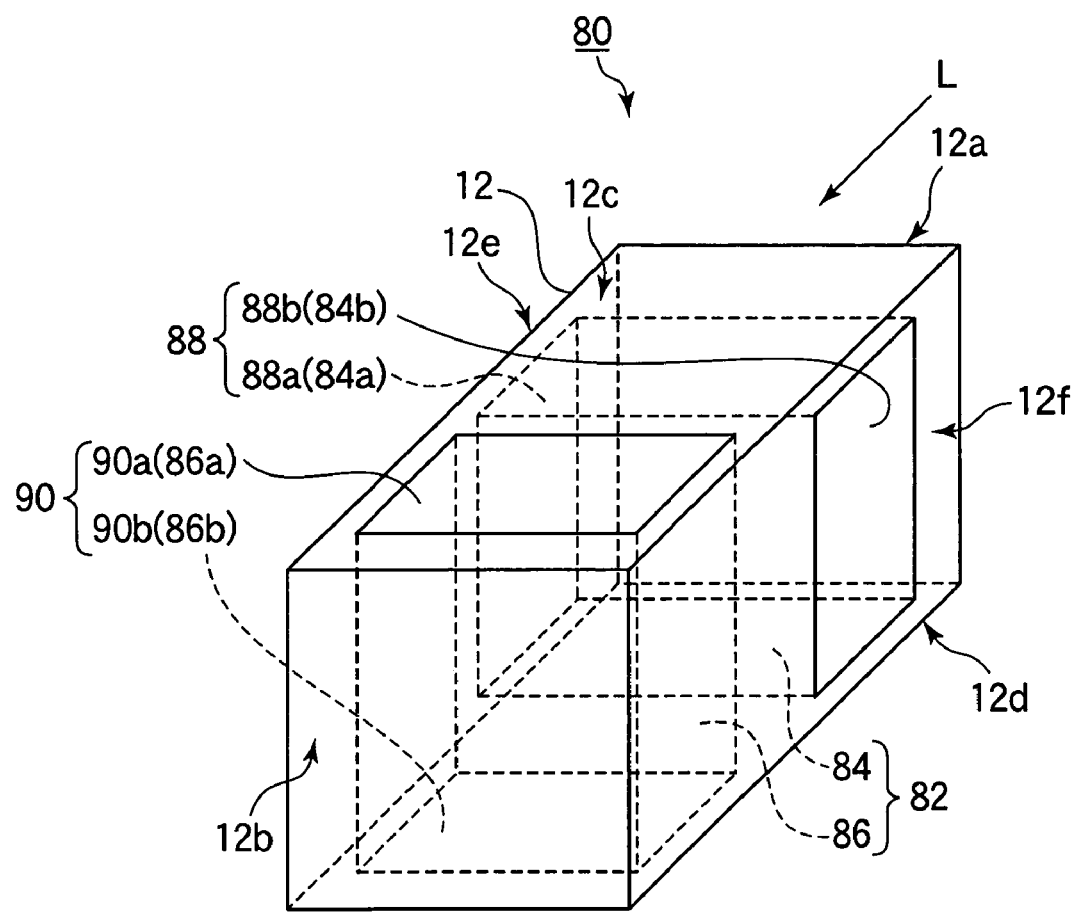
FIG. 41 is a perspective view showing the general structure of the optical deflector in a fifth embodiment of the invention.

FIG. 41 is a perspective view showing the general structure of the optical deflector. For simplicity, electrodes in FIG. 41 are depicted as having no thickness.

Like the preceding embodiments, the optical deflector 80 in the fifth embodiment comprises a block of an electro-optic material 12 with two or more interaction regions. The fifth embodiment differs from the preceding embodiments in that the optical deflector 80 has electrodes not only on its upper and lower major surfaces 12c, 12d but also on both side surfaces.

In the example shown in FIG. 41, the optical deflector 80 has two mutually separated interaction regions 82: a first region 84 and a second region 86. The first region 84 precedes the second region 86 in the light propagation direction.

The electro-optic material 12 is similar to the electro-optic material 12 in the first and second embodiments, having two end facets 12a, 12b, a first major surface or upper major surface 12c, a second major surface or lower major surface 12d, a left side facet 12e, and a right side facet 12f.

The first region 84 has a pair of electrodes 88 including a left side electrode 88a formed on the left side facet 12e of the electro-optic material 12 and a right side electrode 88b formed on the right side facet 12f.

The left side electrode 88a has flat rectangular shape. The part of the left side facet 12e below the left side electrode 88a forms the first facet or the left facet 84a of the first region 84.

The right side electrode 88b is congruent to the left side electrode 88a, and is disposed on the right side facet 12f in an area that forms an orthographic projection of the left side electrode 88a. The part of the right side facet 12f below the right side electrode 88b forms the second facet or the right facet 84b of the first region 84.

The first region 84 accordingly is a rectangular prismatic region in the electro-optic material 12 disposed between the left side electrode 88a and the right side electrode 88b, that is, between the left facet 84a and right facet 84b.

When a voltage is applied across the left side electrode 88a and right side electrode 88b, a horizontal electric field is generated in the first region 84 of the electro-optic material 12. The applied voltage causes the refractive index of the first region 84 to vary linearly in the horizontal direction. As a result, the first region 84 can deflect light L horizontally.

The second region 86 has a pair of electrodes 90 including a front electrode 90a formed on the upper major surface 12c of the electro-optic material 12 and a back electrode 90b formed on the lower major surface 12d.

The front electrode 90a has a flat rectangular shape. The part of the upper major surface 12c below the front electrode 90a forms the third facet or the upper facet 86a of the second region 86.

The back electrode 90b is congruent to the front electrode 90a, and is disposed in an area of the lower major surface 12d that forms an orthographic projection of the front electrode 90a. The part of the lower major surface 12d below the back electrode 90b forms the fourth facet or the lower facet 86b of the second region 86.

The second region 86 is accordingly a rectangular prismatic region in the electro-optic material 12 disposed between the front electrode 90a and the back electrode 90b, or between the upper facet 86a and lower facet 86b.

When a voltage is applied across the front and back electrodes 90a, 90b, an electric field oriented in the depth direction is generated in the second region 86 of the electro-optic material 12. This electric field is orthogonal to the electric field generated in the first region 84. Since the applied voltage causes the refractive index of the second region 86 to vary linearly in the depth direction, the second region 86 can deflect light L in the depth direction.

Next the operation of the optical deflector 80 will be described.

First the operation when a positive voltage is applied to the left side electrode 88a and front electrode 90a and the right side electrode 88b and back electrode 90b are electrically grounded will be described. This operation is shown in plan view in FIG. 42 and in side view FIG. 43, looking from the direction of arrow B in FIG. 42.

Figure 42:
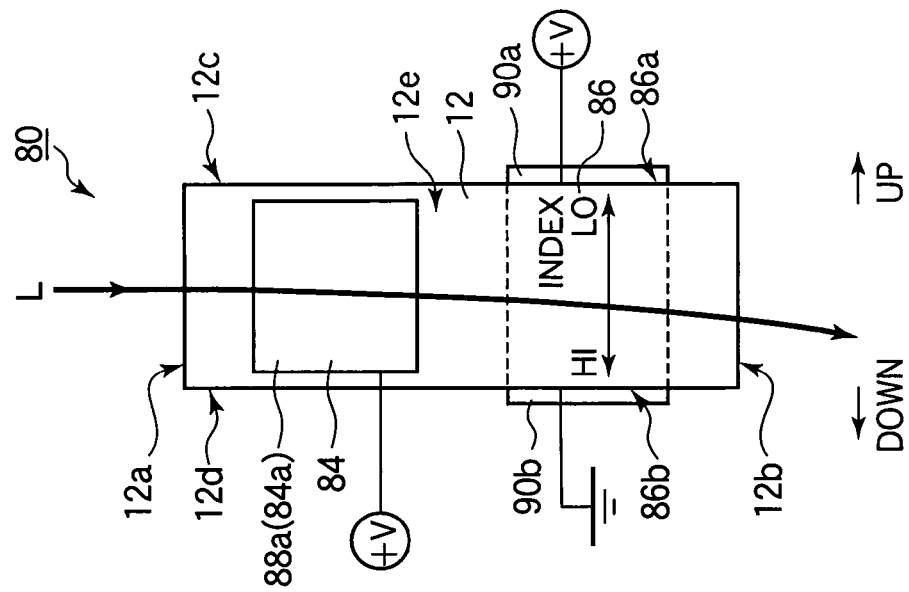
FIG. 42 is a plan view of the optical deflector, showing an optical transmission path in the fifth embodiment.

The refractive index of the first region 84 increases linearly from the left side electrode 88a to the right side electrode 88b. Therefore, as shown in FIG. 42, light L is deflected horizontally towards the right without deflection in the depth direction.

Figure 43:
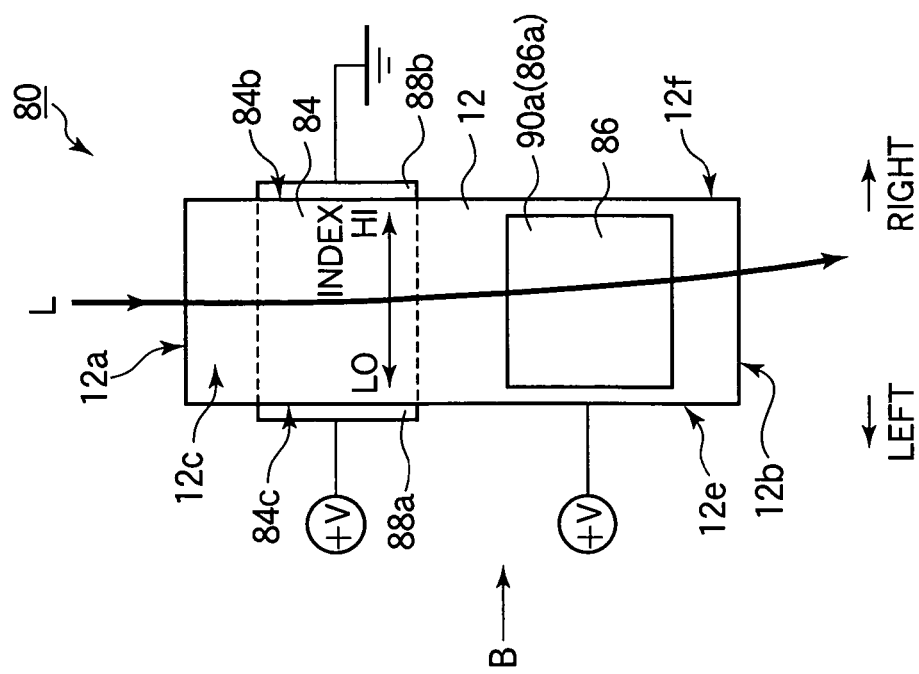
FIG. 43 is a side view of the optical deflector viewed from the direction of arrow B in FIG. 42.

In the second region 86, the refractive index increases linearly from the front electrode 90a to the back electrode 90b. Therefore as shown in FIG. 43, light entering the second region 86 from the first region 84 is deflected downward in the depth direction without deflection in the horizontal direction.

In this example, accordingly, light L is deflected downward and toward the right.

Next, the operation when a positive voltage is applied to the right side electrode 88b and back electrode 90b and the left side electrode 88a and front electrode 90a are electrically grounded will be described. This operation is shown in plan view in FIG. 44 and in side view FIG. 45, looking from the direction of arrow B in FIG. 44.

In this example, the refractive index in the first region 84 decreases linearly from the left side electrode 88a to the right side electrode 88b. As shown in FIG. 44, light L is deflected horizontally toward the left without deflection in the depth direction in the first region 84.

In the second region 86, the refractive index decreases linearly from the front electrode 90a to the back electrode 90b. As shown in FIG. 45, light L entering the second region 86 from the first region 84 is deflected upward without deflection in the horizontal direction.

In this example, accordingly, light L is deflected upward and towards the left.

Although not illustrated, it is possible to deflect light upward and toward the right, or downward and toward the left, by applying suitable voltages to the electrode pairs 88, 90.

The amount of deflection in each direction can be controlled by controlling the magnitude of the applied voltages.

The optical deflector 80 according to this embodiment can deflect a light beam L three-dimensionally with a simple structure having electrodes on the upper and lower major surfaces 12c, 12d and the left and right side facets 12e, 12f of the electro-optic material 12.

In a variation of the fifth embodiment, there are multiple interaction regions with electrodes on the upper and lower major surfaces 12c, 12d, and multiple interaction regions with electrodes on the left and right side facets 12e, 12f. The amount of deflection can then be varied by varying the number of interaction regions to which voltages are applied.

Those skilled in the art will recognize that further variations are possible within the scope of the invention, which is defined in the appended claims.

What is claimed is:

1. An optical deflector, comprising:
an electro-optic material having an interaction region in which an applied electric field produces a refractive-index distribution that varies linearly in a first direction aligned with the applied electric field, for deflecting a light beam in the first direction by refraction within the interaction region according to the refractive-index distribution and deflecting the light beam in a second direction orthogonal to the first direction by refraction at an interface where the light beam enters or leaves the interaction region,
wherein the refractive index of the electro-optic material varies by the Kerr effect and the interaction region comprises at least a first region, a second region, and a third region disposed in series in a direction of propagation of the light beam, and wherein:
the first region has a first surface and a second surface, the light beam entering the first region at the first surface and exiting the first region at the second surface, and the first surface and the second surface being mutually nonparallel;
the second region has a third surface and a fourth surface, the light beam entering the second region at the third surface and exiting the second region at the fourth surface, and the third surface and the fourth surface being mutually nonparallel;
the third region has a fifth surface and a sixth surface, the light beam entering the third region at the fifth surface and exiting the third region at the sixth surface, and the fifth surface and the sixth surface being mutually parallel;
the first surface is parallel to the fourth surface; and
the second surface is parallel to and faces the third surface.

2. The optical deflector of claim 1, wherein:
the first region has a first facet and a second facet, the first and second facets being mutually parallel, being orthogonal to both the first surface and the second surface, and having mutually congruent triangular shapes;
the second region has a third facet and a fourth facet, the third and fourth facets being mutually parallel, being orthogonal to both the third surface and the fourth surface, and having mutually congruent triangular shapes; and
the first region, the second region, and a space between the second and third surfaces combine to form a rectangular parallelepiped.

3. The optical deflector of claim 2, wherein the third region has a fifth facet and a sixth facet, the fifth and sixth facets being mutually parallel and being orthogonal to both the fifth surface and the sixth surface, the third region being a rectangular parallelepiped.

4. The optical deflector of claim 3, further comprising:
a first electrode disposed on the first facet;
a second electrode disposed on the second facet;
a third electrode disposed on the third facet;
a fourth electrode disposed on the fourth facet;
a fifth electrode disposed on the fifth facet; and
a sixth electrode disposed on the sixth facet.

5. The optical deflector of claim 1, wherein the third region comprises two sub-regions with shapes respectively identical to shapes of the first and second regions.

6. An optical deflector for deflecting a light beam, the optical deflector comprising:
an electro-optic material in which an applied electric field produces a refractive-index distribution that varies linearly in a direction aligned with the applied electric field by the Kerr effect, the electro-optic material including a first region and a second region disposed so that the light beam passes first through the first region, and then through the second region;
a first electrode for applying a first electric field to the first region of the electro-optic material in a first direction, thereby deflecting the light beam in the first direction; and
a second electrode for applying a second electric field to the second region of the electro-optic material in a second direction, thereby deflecting the light beam in the second direction, the second direction being orthogonal to the first direction,
wherein the electro-optic material has a first surface, a second surface orthogonally adjoining the first surface, a third surface orthogonally adjoining the second surface and facing the first surface, and a fourth surface orthogonally adjoining the first surface and the third surface and facing the second surface, the first electrode being disposed on the first surface, the second electrode being disposed on the second surface, further comprising:
a third electrode disposed on the third surface, facing the first electrode; and
a fourth electrode disposed on the fourth surface, facing the second electrode.

7. The optical deflector of claim 6, wherein the first electrode, the second electrode, the third electrode, and the fourth electrode have rectangular shapes, the first region forms a rectangular prism disposed between the first and third electrodes, and the second region forms a rectangular prism disposed between the second and fourth electrodes.

* * * * *